(12) United States Patent
Ito et al.

(10) Patent No.: US 12,334,259 B2
(45) Date of Patent: Jun. 17, 2025

(54) CAPACITOR, COMPOSITE MATERIAL FOR CAPACITOR, AND MANUFACTURING METHOD THEREOF

(71) Applicant: Azul Energy Inc., Miyagi (JP)

(72) Inventors: Koju Ito, Sendai (JP); Koki Nakamura, Sendai (JP)

(73) Assignee: AZUL Energy Inc., Miyagi (JP)

( * ) Notice: Subject to any disclaimer, the term of this patent is extended or adjusted under 35 U.S.C. 154(b) by 73 days.

(21) Appl. No.: 18/553,118

(22) PCT Filed: Apr. 20, 2022

(86) PCT No.: PCT/JP2022/018289
§ 371 (c)(1),
(2) Date: Sep. 28, 2023

(87) PCT Pub. No.: WO2022/224990
PCT Pub. Date: Oct. 27, 2022

(65) Prior Publication Data
US 2024/0379298 A1 Nov. 14, 2024

(30) Foreign Application Priority Data

Apr. 21, 2021 (JP) .................................. 2021-071771

(51) Int. Cl.
*H01G 11/32* (2013.01)
(52) U.S. Cl.
CPC .................................... *H01G 11/32* (2013.01)
(58) Field of Classification Search
None
See application file for complete search history.

(56) References Cited

U.S. PATENT DOCUMENTS

| 11,772,084 B2 * | 10/2023 | Yabu ..................... H01M 12/08 429/531 |
| 2021/0308659 A1 * | 10/2021 | Yabu .................. H01M 4/8652 |
| 2023/0223554 A1 * | 7/2023 | Ito ......................... H01M 12/08 |
| 2024/0379298 A1 * | 11/2024 | Ito ......................... H01G 11/36 |

FOREIGN PATENT DOCUMENTS

| CN | 105280398 A | * | 1/2016 |
| CN | 105321730 A | * | 2/2016 |
| JP | H02232268 A | | 9/1990 |
| JP | 2008091132 A | | 4/2008 |
| JP | 2009117696 A | | 5/2009 |
| JP | 2014172764 A | | 9/2014 |
| JP | 2015091578 A | | 5/2015 |
| WO | 2007023964 A1 | | 3/2007 |
| WO | WO-2019167407 A1 | * | 9/2019 ............ B01J 31/183 |

OTHER PUBLICATIONS

PCT Office, International Search Report issued in PCT/JP2022/018289 dated Jul. 19, 2022.

* cited by examiner

*Primary Examiner* — Dion R. Ferguson
(74) *Attorney, Agent, or Firm* — Wood Herron & Evans LLP

(57) ABSTRACT

Provided is a capacitor and a composite material for a capacitor which have a high capacity, and a manufacturing method thereof. Provided is a capacitor, a composite material for a capacitor, and a manufacturing method thereof, in which the capacitor includes a pair of electrodes and an electrolyte, and at least one of the electrodes contains a metal complex or an adduct thereof and a carbon material which are represented by expressions (1) or (2).

12 Claims, 3 Drawing Sheets

CAPACITOR, COMPOSITE MATERIAL FOR CAPACITOR, AND MANUFACTURING METHOD THEREOF

TECHNICAL FIELD

The present invention relates to a capacitor, a composite material for a capacitor, and a manufacturing method thereof.

BACKGROUND ART

A supercapacitor refers to a capacitor characterized by having a very high capacitance compared to a conventional capacitor. A supercapacitor contains a carbon-based material such as activated carbon in an electrode to form an electric double layer in which oppositely charged ions are disposed on an electrolytic solution side of an electrode/electrolytic solution interface, and thereby accumulates a large amount of electric charge.

A capacitance of the supercapacitor basically depends on a specific surface area of an electrode material. Therefore, for an increase in capacity of the supercapacitor, a method using nanocarbons such as carbon nanotubes or graphene as the electrode material has been studied. However, since nanocarbons are more expensive than activated carbon, cost reduction of the electrode material is required for practical use of the supercapacitor.

Also, there is a lithium ion capacitor as a new supercapacitor that has been developed in recent years. A lithium ion capacitor is a supercapacitor whose energy density is improved by using a carbon-based material capable of absorbing lithium ions as a negative electrode material while using a principle of an electric double layer capacitor.

On the other hand, although an energy density of a supercapacitor has increased significantly in recent years, there is still a problem that an energy density that can be stored is low compared to that of a secondary battery. Therefore, it is desired to develop a supercapacitor with a further increased energy density in addition to the conventional high power density.

It is known that, when a metal oxide of a certain type is contained in an electrode of a supercapacitor as a means for increasing an energy density, since an oxidation-reduction capacity (redox capacity, pseudo-capacitance) can also be used in addition to a capacitance of the electric double layer, it is possible to obtain a larger capacitance than a case in which only a carbon-based material is used for the electrode. Utilizing this principle, attempts have been widely made to apply a material exhibiting an oxidation-reduction capacity to electrode materials of supercapacitors. Particularly, ruthenium oxide ($RuO_2$) is known to exhibit an excellent pseudo-capacitance, and for example, Patent Document 1 describes a capacitor in which the ruthenium oxide is supported on a conductive substrate.

However, since rare metals such as ruthenium are expensive and an amount of resources are limited, it has been desired to develop a capacitor using a material that is lower in cost and has abundant resources.

CITATION LIST

Patent Document

Patent Document 1

Japanese Unexamined Patent Application, First Publication No. 2009-117696

SUMMARY OF INVENTION

Technical Problem

The present invention has been made to solve the above-described problems in conventional technologies, and an objective thereof is to provide a capacitor and a composite material for a capacitor which have a high capacity without using a rare metal such as ruthenium, and a manufacturing method thereof.

Solution to Problem

As a result of intensive studies on the above-described problems, the present inventors have unexpectedly found that a capacitor with a high capacity can be obtained when at least one of electrodes contains a metal complex or an adduct thereof and a carbon material which have a specific chemical structure, and thus have reached the present invention.

An objective of the present invention is achieved by a capacitor including a pair of electrodes and an electrolyte, in which at least one of the electrodes contains a metal complex or an adduct thereof and a carbon material which are represented by the following expression (1) or (2).

[Chem. 1]

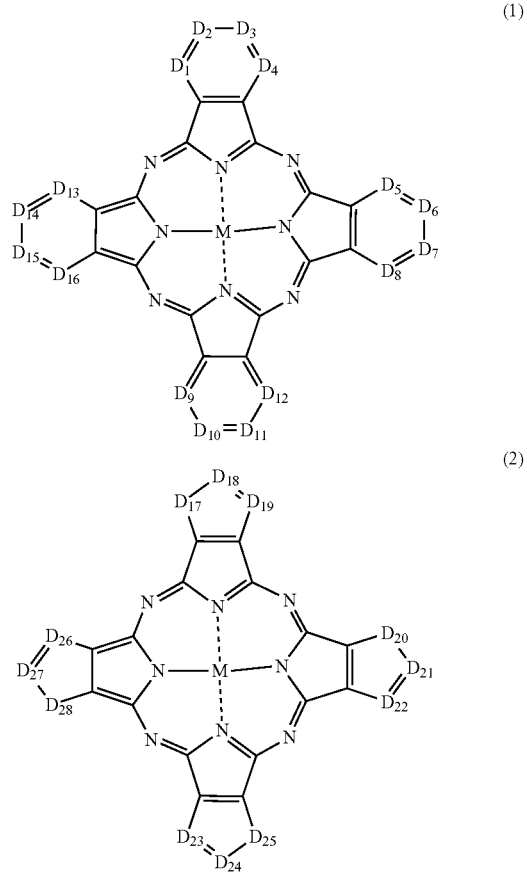

(In the expression,
M is a metal atom,
$D^1$ to $D^{28}$ are each independently a nitrogen atom, a sulfur atom, or a carbon atom, and if $D^1$ to $D^{28}$ are carbon atoms, the carbon atoms may each be independently bonded to a hydrogen atom, a halogen atom, an alkyl group, a cycloalkyl group, an alkenyl group, an alkynyl group, an aryl group, an alkylsulfonyl group, an alkoxy group, or an alkylthio group)

In expression (1) or (2), M is preferably a manganese atom, an iron atom, a cobalt atom, a nickel atom, a copper atom, or a zinc atom.

In expression (1) or (2), $D^1$ to $D^{16}$ are preferably nitrogen atoms or carbon atoms.

In expression (1) or (2), $D^{17}$ to $D^{28}$ are preferably sulfur atoms or carbon atoms.

The metal complex or an adduct thereof is preferably represented by the following expressions.

[Chem. 2]

Compound (1)

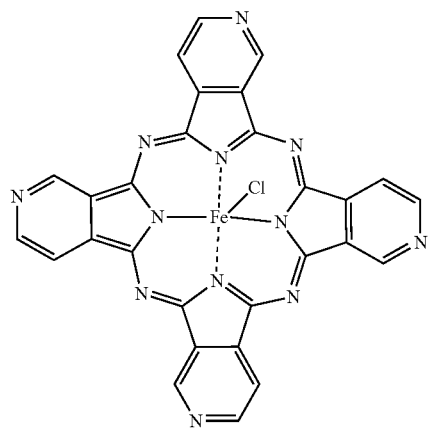

Compound (2)

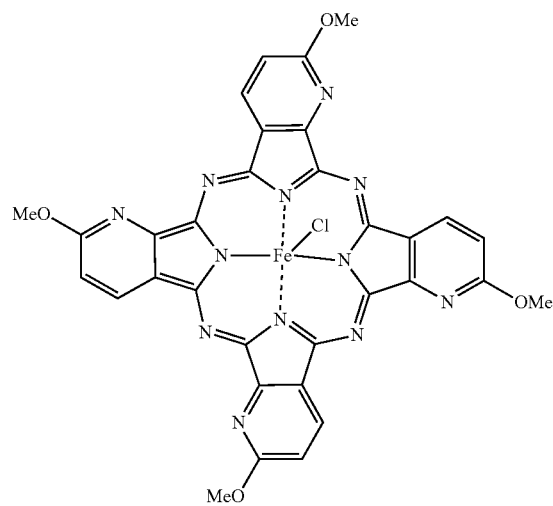

Compound (3)

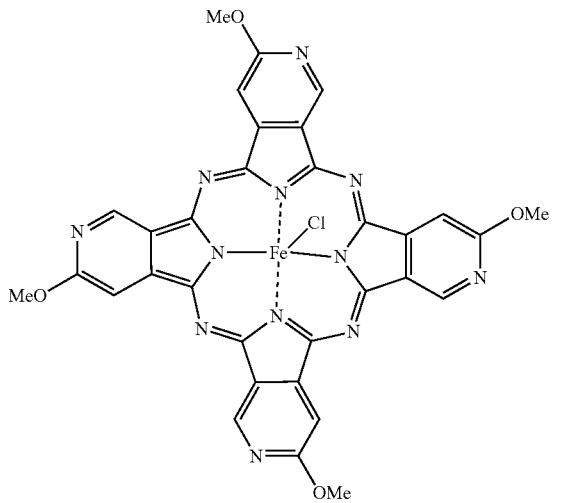

Compound (4)

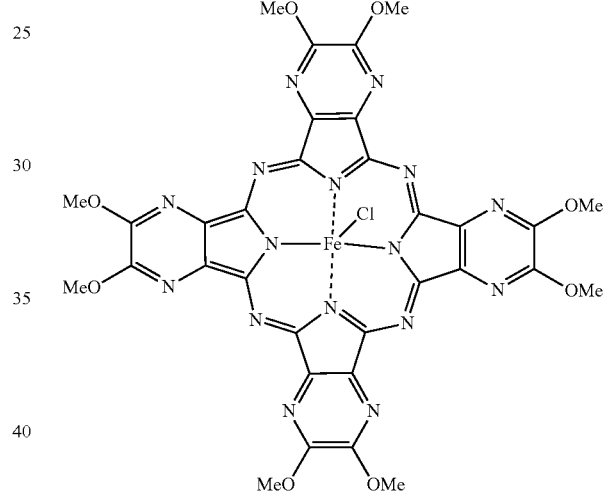

Compound (5)

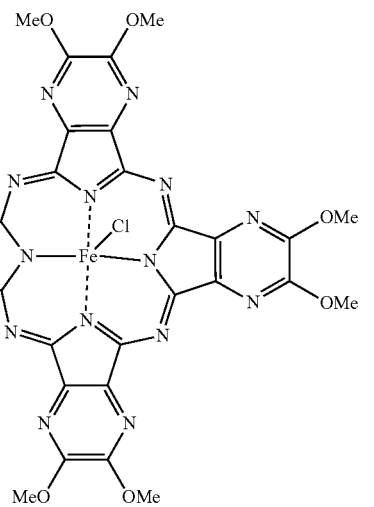

-continued
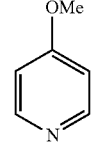
Compound (6)
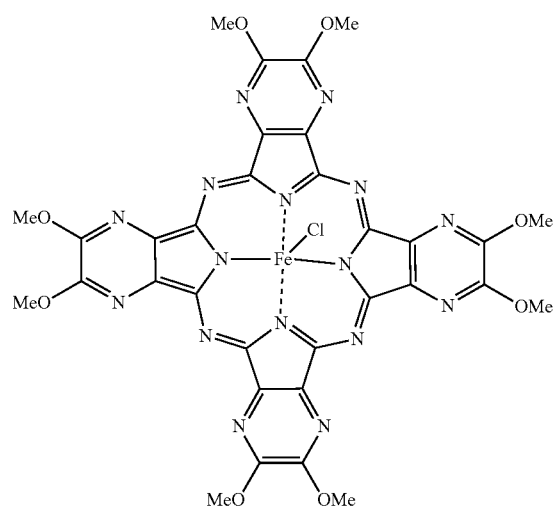
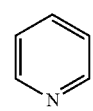
Compound (7)
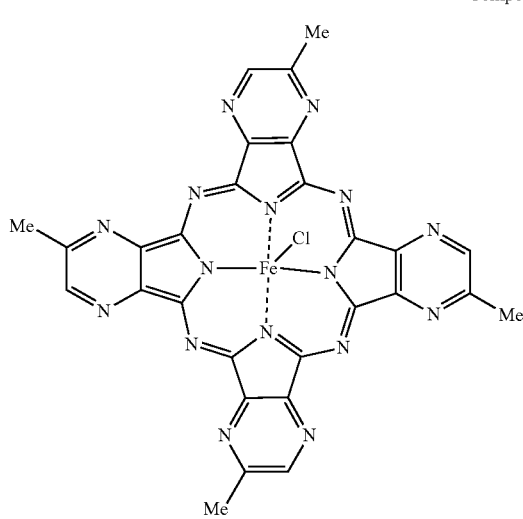
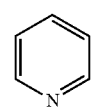
Compound (8)
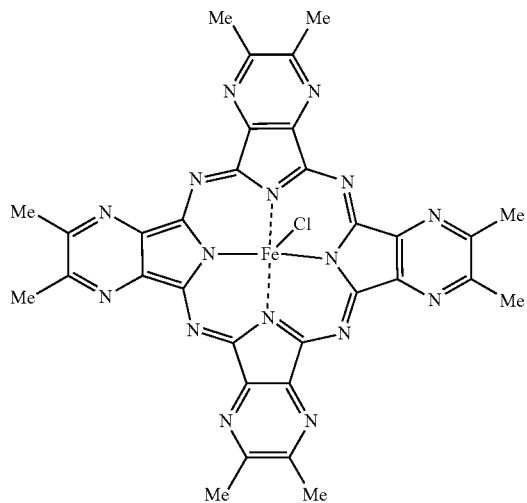
Compound (9)
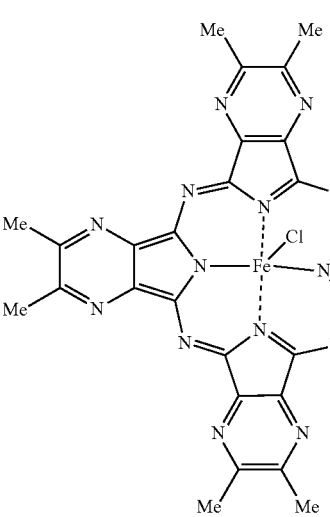
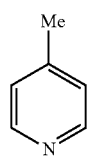

Compound (10)
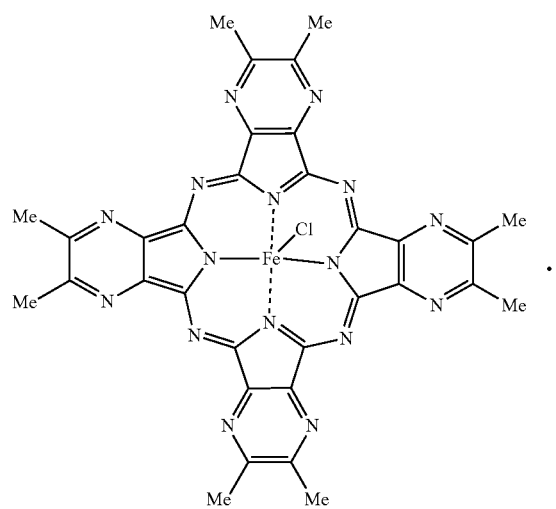
Compound (11)
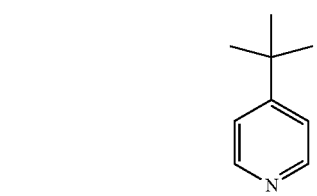
[Chem. 4]
Compound (12)
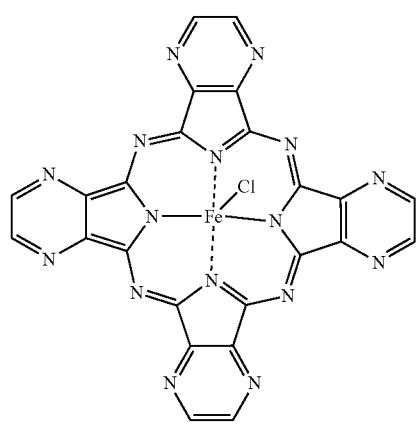
Compound (13)
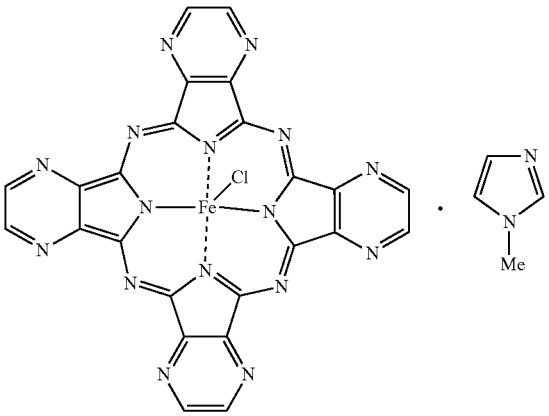
Compound (14)
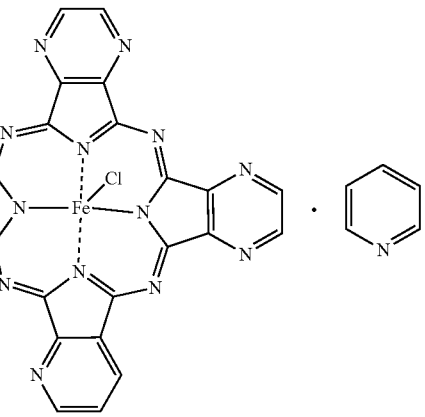
Compound (15)
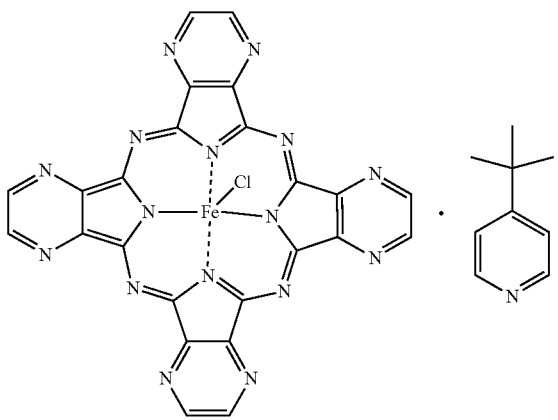

Compound (16)
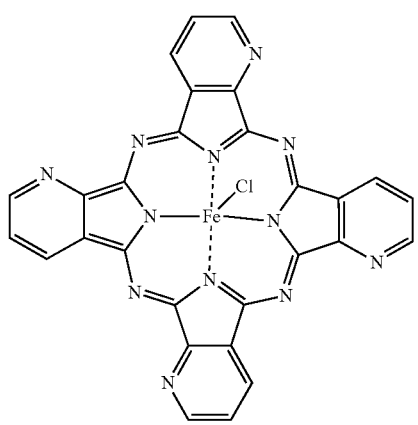
[Chem. 5]
Compound (17)
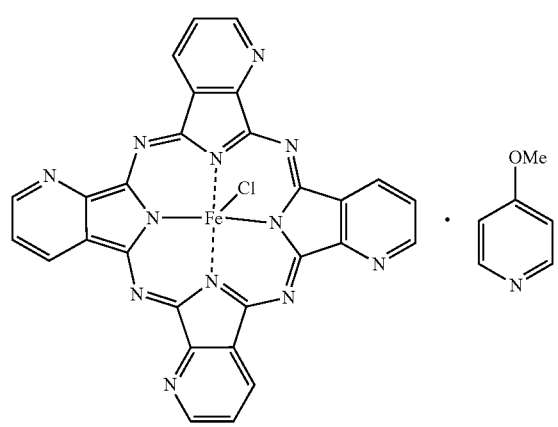
Compound (18)
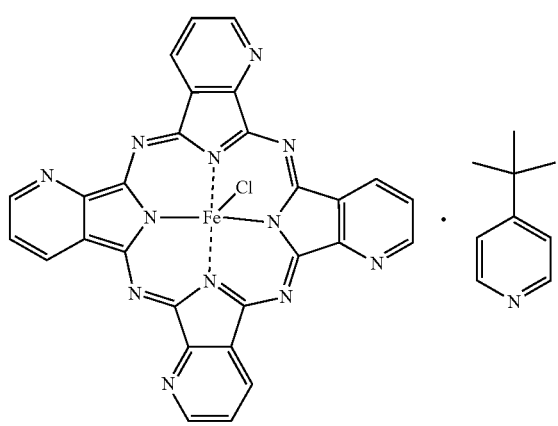
Compound (19)
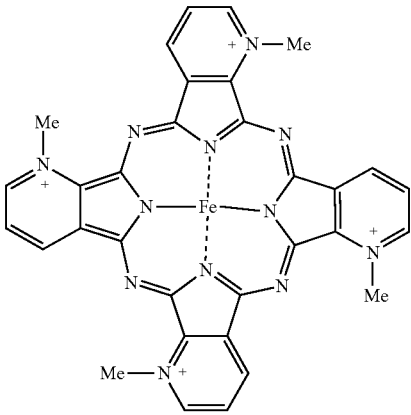
Compound (20)
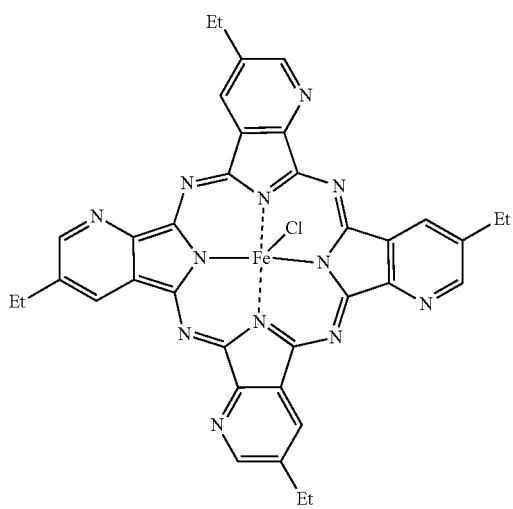
Compound (21)
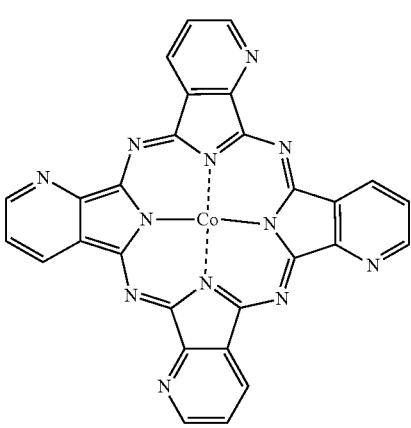

-continued
Compound (22)
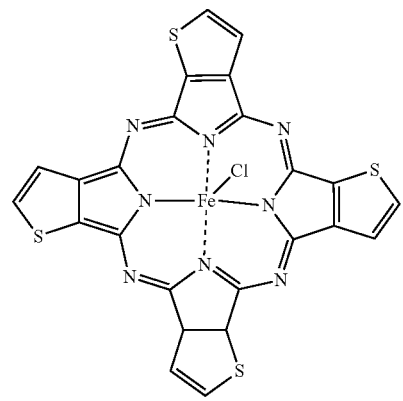
[Chem. 6]
Compound (25)
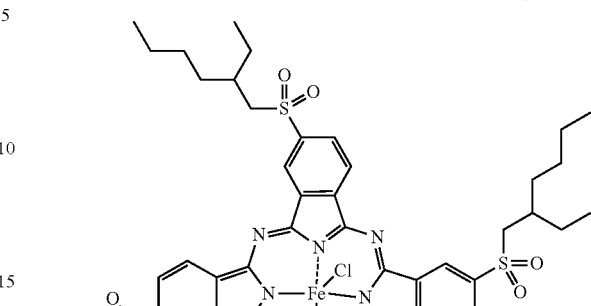
Compound (23)
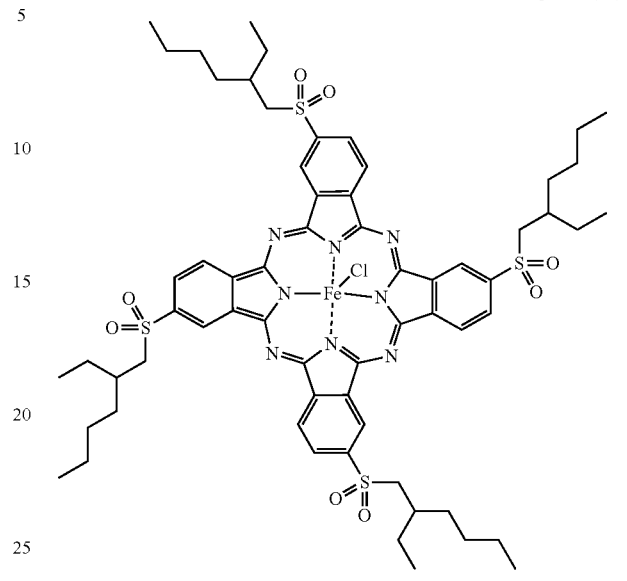
Compound (26)
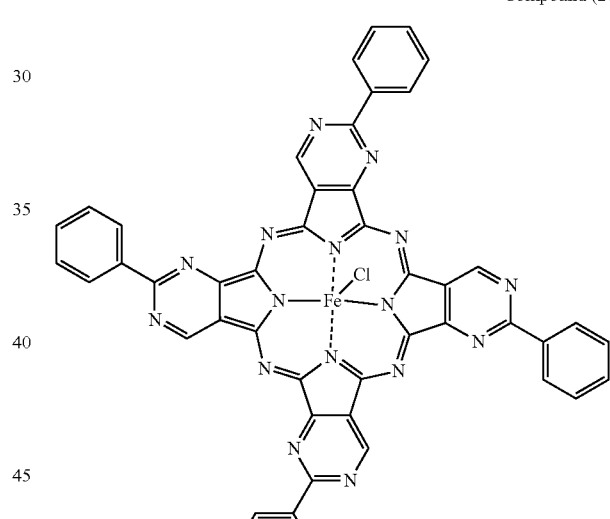
Compound (24)
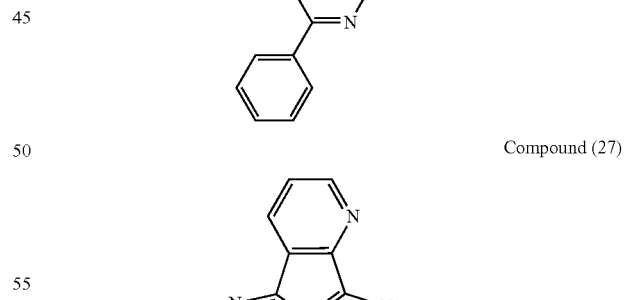
Compound (27)
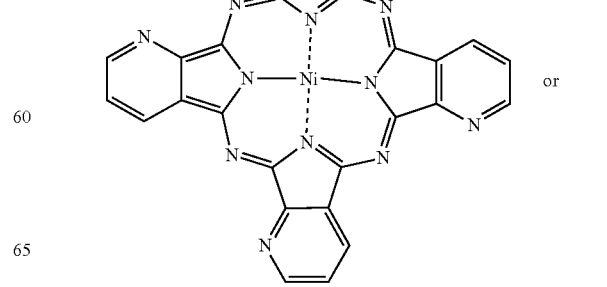
or Compound (28)

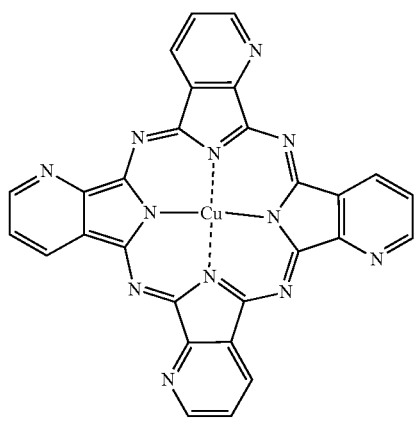

The metal complex or an adduct thereof is preferably contained in an amount of 0.1 to 50% by mass with respect to 100% by mass of a total amount of the metal complex or an adduct thereof and the carbon material.

The carbon material is preferably selected from activated carbon, Ketjen black, graphite, an amorphous carbon, graphene, carbon black, carbon fibers, mesocarbon microbeads, microcapsule carbon, fullerenes, carbon nanoforms, carbon nanotubes, and carbon nanohorns.

The electrode preferably includes a composite material for a capacitor containing the metal complex or an adduct thereof and the carbon material which are represented by the above-described expressions (1) or (2).

The composite material for a capacitor preferably has a capacity density of 20 F/cm³ or more.

The present invention is also related to a manufacturing method of a composite material for a capacitor of the present invention including
(a) a step of preparing a solution by dissolving the metal complex or an adduct thereof in a solvent,
(b) a step of preparing a dispersion liquid by dispersing the carbon material in the solution, and
(c) a step of removing the solvent from the dispersion liquid.

The above-described steps (a) and (b) are preferably performed at a temperature below a boiling point of the solvent.

A solubility of the metal complex or an adduct thereof with respect to the solvent is preferably 0.1 g/L or more.

Advantageous Effects of Invention

According to the present invention, at least one of the electrodes contains a metal complex or an adduct thereof and a carbon material which have a specific chemical structure, and thereby a capacitor with a high capacity can be provided. Also, since the metal complex or an adduct thereof of the present invention is easily adsorbed on the carbon material, a capacitor having a high capacity can be manufactured without going through a complicated manufacturing processes.

Also, since the present invention does not use a rare metal such as ruthenium, it is possible to provide a capacitor having a high capacity that is relatively inexpensive and not constrained by resource supply.

DESCRIPTION OF EMBODIMENTS

Figure 1:
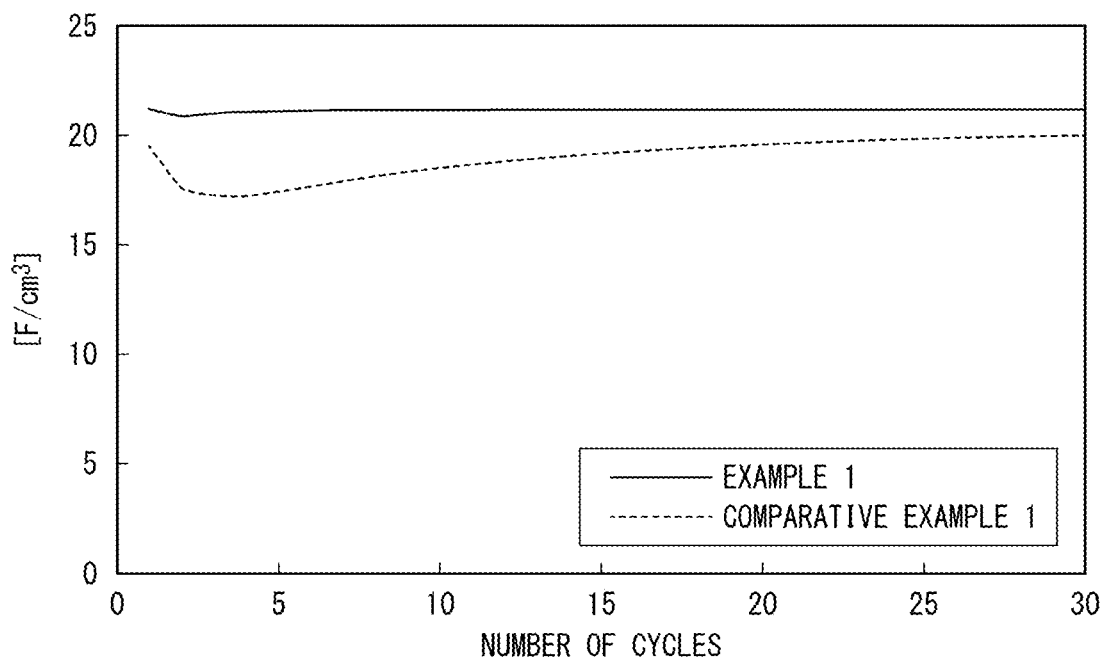
FIG. 1 is a graph showing results of charge/discharge tests of example 1 and comparative example 1.

A capacitor of the present invention is a capacitor including a pair of electrodes and an electrolyte, in which at least one of the electrodes contains a metal complex or an adduct thereof and a carbon material which have a specific chemical structure.

Metal Complex or an Adduct Thereof

The metal complex or an adduct thereof of the present invention is represented by the following expression (1) or (2).

[Chem. 7]

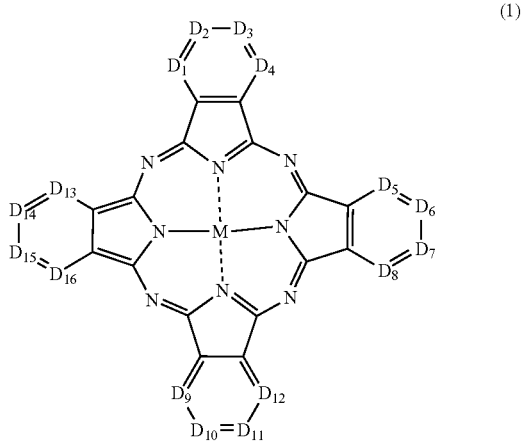

(1)

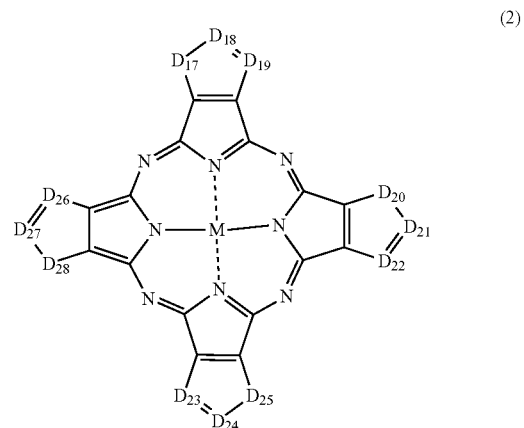

(2)

(In the expression,
M is a metal atom,
$D^1$ to $D^{28}$ are each independently a nitrogen atom, a sulfur atom, or a carbon atom, and if $D^1$ to $D^{28}$ are carbon atoms, the carbon atoms may each be independently bonded to a hydrogen atom, a halogen atom, an alkyl group, a cycloalkyl group, an alkenyl group, an alkynyl group, an aryl group, an alkylsulfonyl group, an alkoxy group, or an alkylthio group)

The bond between the nitrogen atom and M means a coordination of the nitrogen atom to M. A halogen atom, a hydroxyl group, or a hydrocarbon group with the number of carbon atoms of 1 to 8 may be further bonded to M as a ligand. Also, an anionic counterion may also be present to achieve electrical neutrality. Further, it may exist as an adduct to which an electrically neutral molecule is added.

A valence of M is not particularly limited. In order for the metal complex or an adduct thereof to be electrically neutral, a halogen atom, a hydroxyl group, or an (alkyloxy group) alkoxy group with the number of carbon atoms of 1 to 8 may be bonded as the ligand (for example, an axial ligand), or an anionic counterion may be present. As the anionic counterion, a halide ion, a hydroxide ion, a nitrate ion, and a sulfate ion are exemplified. Also, a structure of an alkyl group of the (alkyloxy group) alkoxy group with the number of carbon atoms of 1 to 8 may be linear, branched, or cyclic.

Examples of M include a scandium atom, a titanium atom, a vanadium atom, a chromium atom, a manganese atom, an iron atom, a cobalt atom, a nickel atom, a copper atom, a zinc atom, an yttrium atom, a zirconium atom, a niobium atom, a ruthenium atom, a rhodium atom, a palladium atom, a lanthanum atom, a cerium atom, a praseodymium atom, a neodymium atom, a promethium atom, a samarium atom, a europium atom, a gadolinium atom, a terbium atom, a dysprosium atom, a holmium atom, an erbium atom, a thulium atom, a ytterbium atom, a lutetium, an actinium atom, a thorium atom, a protactinium atom, an uranium atom, a neptunium atom, a plutonium atom, an americium atom, a curium atom, a berkelium atom, a californium atom, an einsteinium atom, a fermium atom, a mendelevium atom, a nobelium atom, and a lawrencium atom. Of these, M is preferably a manganese atom, an iron atom, a cobalt atom, a nickel atom, a copper atom, or a zinc atom, and more preferably an iron atom, a cobalt atom, a nickel atom, or a copper atom.

As the halogen atom in the present invention, fluorine, chlorine, bromine, and iodine can be mentioned.

In the present invention, the alkyl group refers to a monovalent hydrocarbon group that is linear or branched. The number of carbon atoms in the alkyl group is preferably 1 to 20, more preferably 1 to 12, and still more preferably 1 to 6. As the alkyl group, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, and an n-hexyl group are exemplified.

In the present invention, the cycloalkyl group represents a cyclic monovalent hydrocarbon group. The number of carbon atoms in the cycloalkyl group is preferably 3 to 20, more preferably 3 to 12, and still more preferably 3 to 6. As the cycloalkyl group, a cyclopropyl group, a cyclobutyl group, a cyclopentyl group, a cyclohexyl group, a 1-methylcyclopropyl group, a 2-methylcyclopropyl group, and a 2,2-dimethylcyclopropyl group are exemplified.

In the present invention, the alkenyl group refers to a linear or branched monovalent hydrocarbon group containing a double bond. The number of carbon atoms in the alkenyl group is preferably 2 to 20, more preferably 2 to 12, and still more preferably 2 to 6. Examples of the alkenyl group include a vinyl group, a 1-propenyl group, a 2-propenyl group, a 1-butenyl group, a 2-butenyl group, a 3-butenyl group, a 1-methyl-2-propenyl group, a 2-methyl-2-propenyl group, a 1-pentenyl group, a 2-pentenyl group, a 3-pentenyl group, a 4-pentenyl group, a 1-methyl-2-butenyl group, a 2-methyl-2-butenyl group, a 1-hexenyl group, a 2-hexenyl group, a 3-hexenyl group, a 4-hexenyl group, and a 5-hexenyl group.

The alkynyl group in the present invention refers to a linear or branched monovalent hydrocarbon group containing a triple bond. The number of carbon atoms in the alkynyl group is preferably 2 to 20, more preferably 2 to 12, and still more preferably 2 to 6. Examples of the alkynyl group include an ethynyl group, a 1-propynyl group, a 2-propynyl group, a (1-butynyl group) 1-butyn-1-yl group, a (2-butynyl group) 2-butyn-1-yl group, a (3-butynyl group) 3-butyn-1-yl group, a (1-methyl-2-propynyl group) 1-methyl-2-propyn-1-yl group, a (2-methyl-3-butynyl group) 2-methyl-3-butyne-2-yl group, a (1-pentynyl group) 1-pentyn-1-yl group, a (2-pentynyl group) 2-pentyn-1-yl group, a (3-pentynyl group) 3-pentyn-2-yl group, a (4-pentynyl group) 4-pentyn-1-yl group, a 1-methyl-2-butynyl group (1-methyl-2-butyn-1-yl group), a (2-methyl-3-pentynyl group) 2-methyl-3-pentyn-1-yl group, a (1-hexynyl group) 1-hexyn-1-yl group, and a (1,1-dimethyl-2-butynyl group) 1,1-dimethyl-2-butyn-1-yl group.

In the present invention, the aryl group refers to a monovalent aromatic hydrocarbon group. The number of carbon atoms in the aryl group is preferably 6 to 40, and more preferably 6 to 30. Examples of the aryl group include a phenyl group, a biphenyl group, a terphenyl group, a naphthyl group, a fluorenyl group, a benzofluorenyl group, a dibenzofluorenyl group, a phenanthryl group, an anthracenyl group, a benzophenanthryl group, a benzoanthracenyl group, a chrysenyl group, a pyrenyl group, a fluoranthenyl group, a triphenylenyl group, a benzofluoranthenyl group, a dibenzoanthracenyl group, a perylenyl group, and a helicenyl group.

In the present invention, the alkylsulfonyl group refers to a monovalent group in which an alkyl group is bonded to a sulfonyl group. The alkyl group in the alkylsulfonyl group can be the groups mentioned for the "alkyl group" above. The number of carbon atoms in the alkylsulfonyl group is preferably 1 to 20, more preferably 1 to 12, and still more preferably 1 to 6. Examples of the alkylsulfonyl group include a methylsulfonyl group, an ethylsulfonyl group, a normal propylsulfonyl group, an isopropylsulfonyl group, an n-butylsulfonyl group, a sec-butylsulfonyl group, a tert-butylsulfonyl group, an n-pentylsulfonyl group, an isopentylsulfonyl group, a tert-pentylsulfonyl group, a neopentylsulfonyl group, a 2,3-dimethylpropylsulfonyl group, a 1-ethylpropylsulfonyl group, a 1-methylbutylsulfonyl group, an n-hexylsulfonyl group, an isohexylsulfonyl group, and a 1,1,2-trimethylpropylsulfonyl group.

In the present invention, the alkoxy group refers to a monovalent group in which a hydrocarbon group is bonded through an ether linkage. The number of carbon atoms in the alkoxy group is preferably 1 to 20, more preferably 1 to 12, and still more preferably 1 to 6. Examples of the alkoxy group include a methoxy group, an ethoxy group, an n-propoxy group, an n-butoxy group, an n-pentyloxy group, an n-hexyloxy group, an isopropoxy group, an isobutoxy group, a sec-butoxy group, a tert-butoxy group, and an isohexyloxy group.

In the present invention, the alkylthio group refers to a group in which an oxygen atom of the alkoxy group in the ether linkage is substituted with a sulfur atom. The number of carbon atoms in the alkylthio group is preferably 1 to 20, more preferably 1 to 16, and still more preferably 1 to 12. Examples of the alkylthio group include a methylthio group, an ethylthio group, an n-propylthio group, an n-butylthio group, an n-pentylthio group, an n-hexylthio group, and an isopropylthio group.

The alkyl group, the cycloalkyl group, the alkenyl group, the alkynyl group, the aryl group, the alkylsulfonyl group, the alkoxy group, and the alkylthio group may be unsubstituted substituents, but they may each be substituted with one or more substituents such as a halogen, an alkyl group, an alkenyl group, an alkynyl group, an aryl group, an alkoxy group, an alkylthio group, a cyano group, a carbonyl group, a carboxyl group, an amino group, a nitro group, a silyl group, and a sulfo group.

$D^1$ to $D^{16}$ are preferably nitrogen atoms or carbon atoms, and $D^{17}$ to $D^{28}$ are preferably sulfur atoms or carbon atoms. The number of nitrogen atoms in $D^1$ to $D^{16}$ is preferably 2 to 12, and more preferably 4 to 8. The number of sulfur atoms in $D^{17}$ to $D^{28}$ is preferably 2 to 10, and more preferably 4 to 8.

Preferably, the metal complex or an adduct thereof of the present invention is a compound represented by the following expression.

[Chem. 8]

Compound (1)

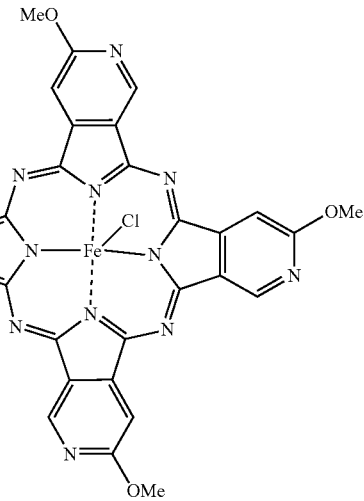

Compound (2)

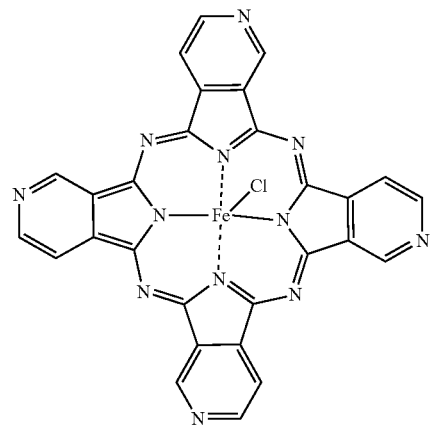

-continued

Compound (3)

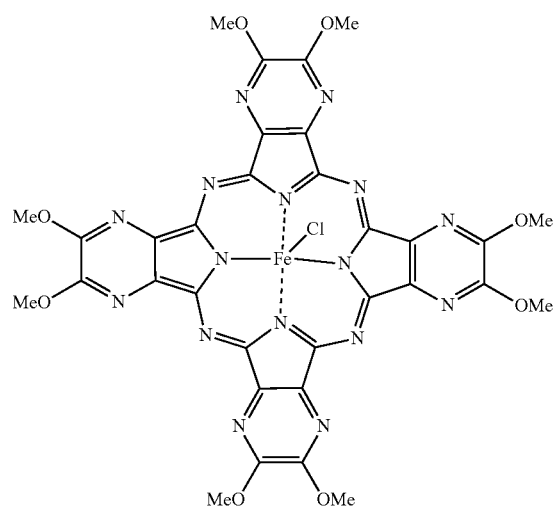

Compound (4)

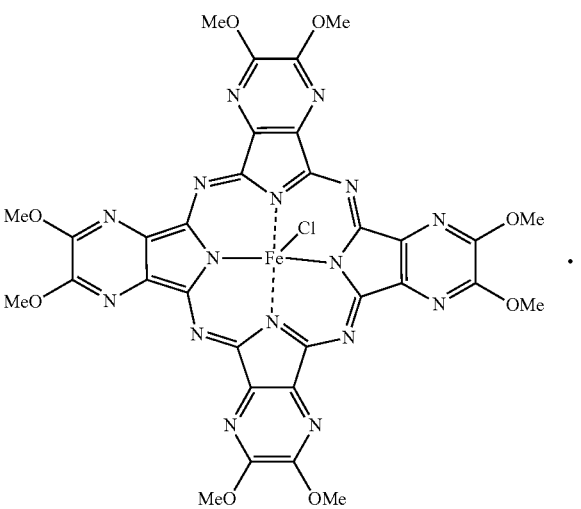

Compound (5)

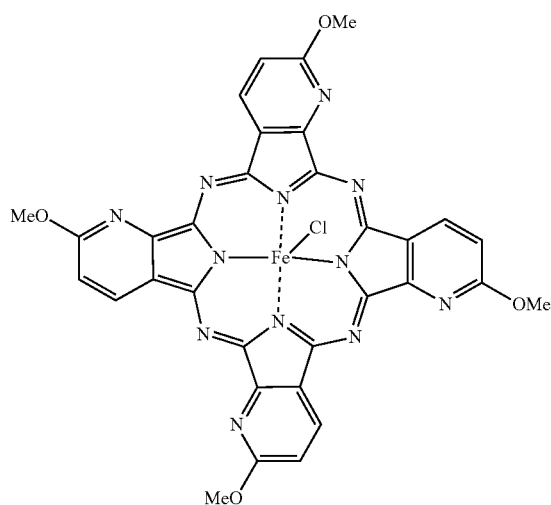

-continued
Compound (6)
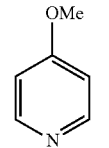
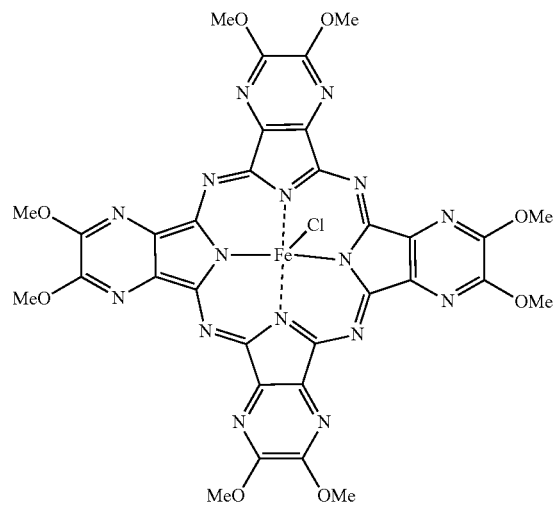
[Chem. 9]
Compound (7)
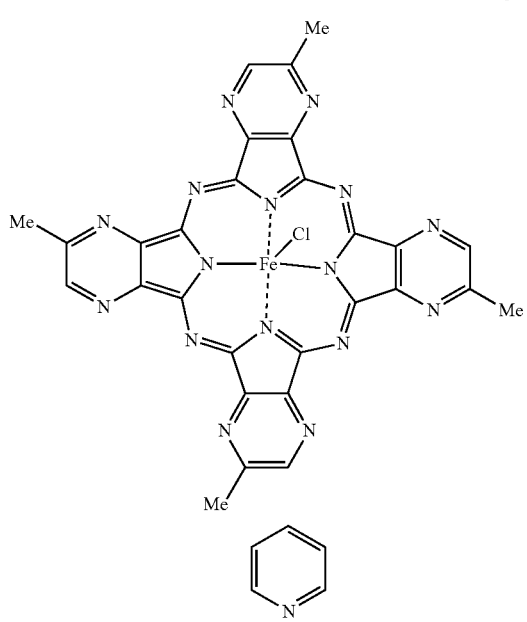
-continued
Compound (8)
Compound (9)
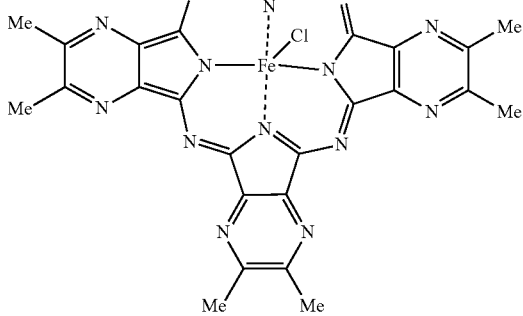
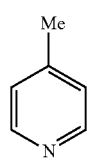

-continued
Compound (10)
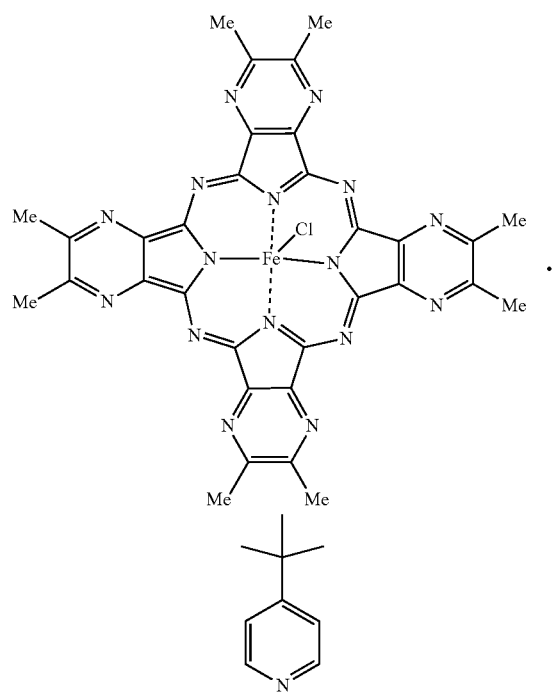
Compound (11)
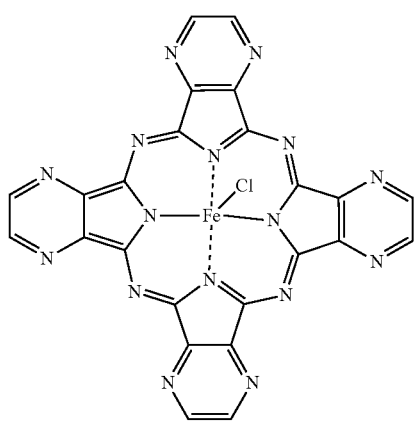
[Chem. 10]
Compound (12)
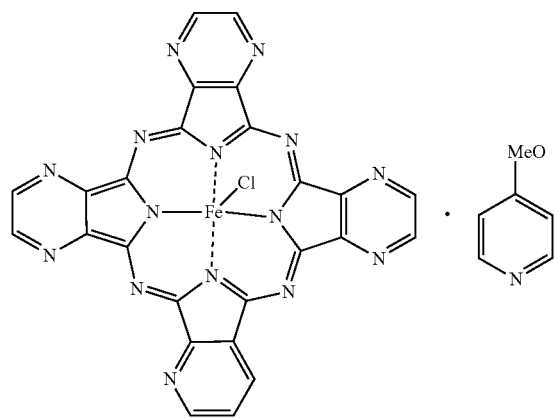
Compound (13)
Compound (14)
Compound (15)
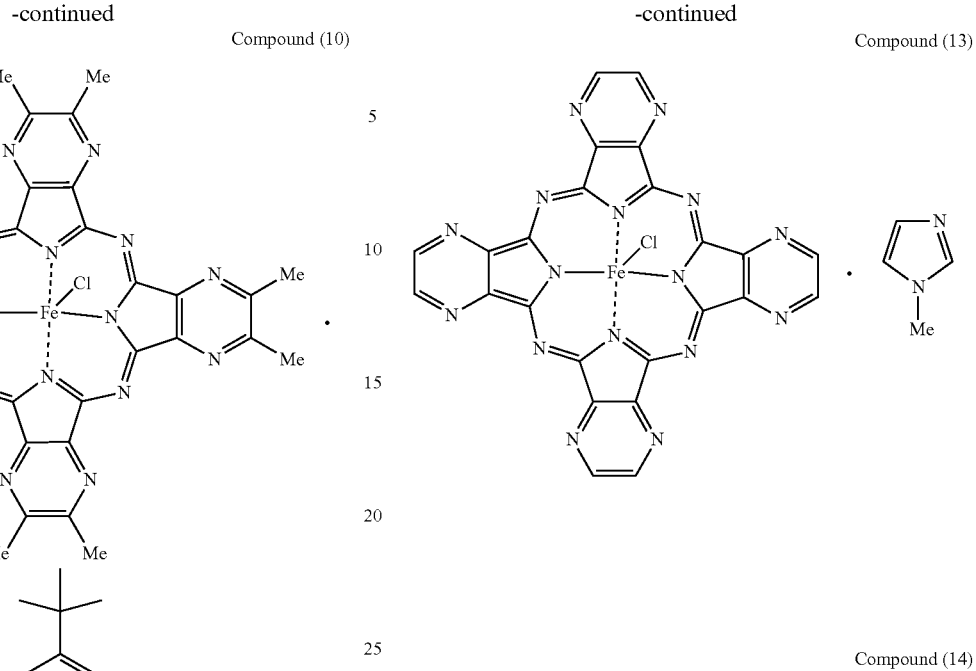
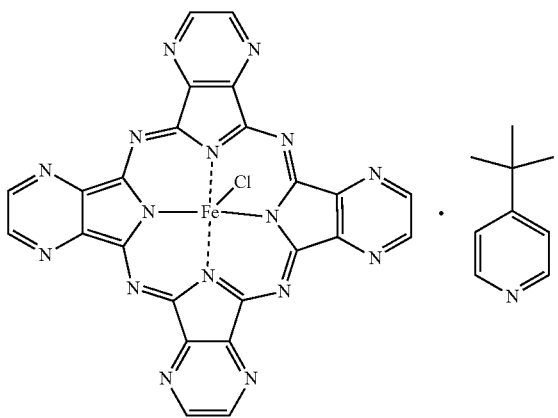

Compound (16)
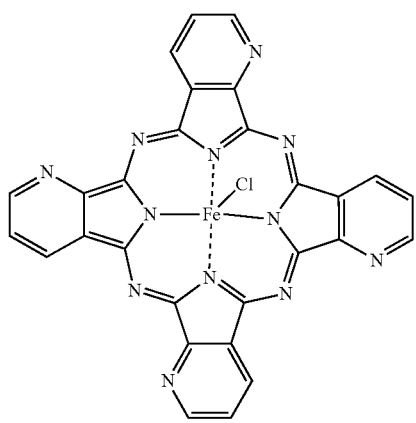
Compound (19)
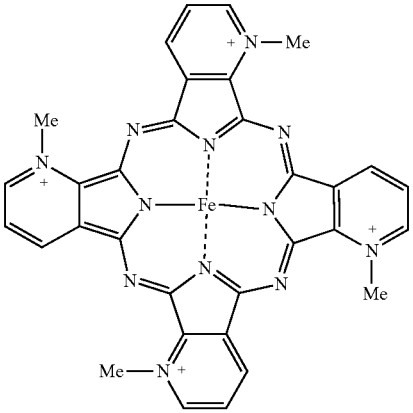
[Chem. 11]
Compound (17)
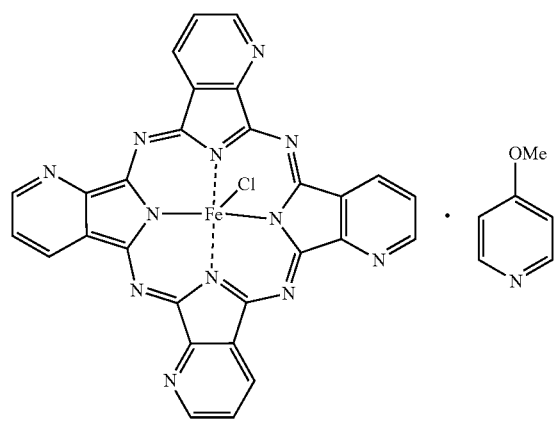
Compound (20)
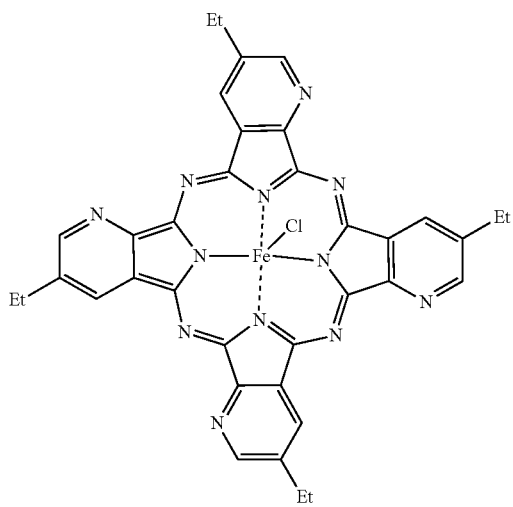
Compound (18)
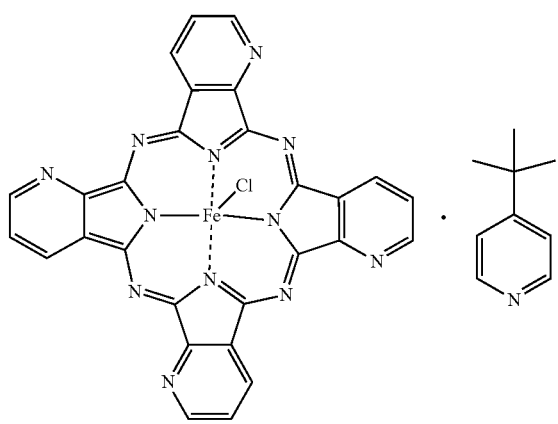
Compound (21)
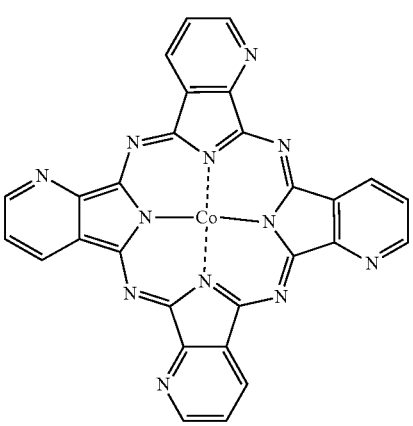

Compound (22)
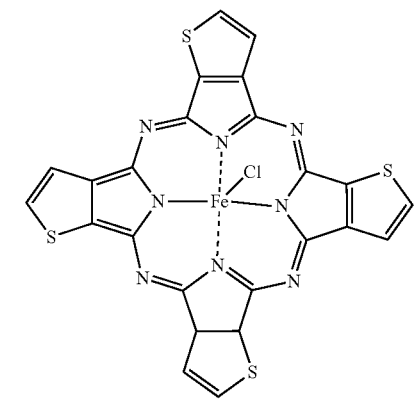
Compound (23)
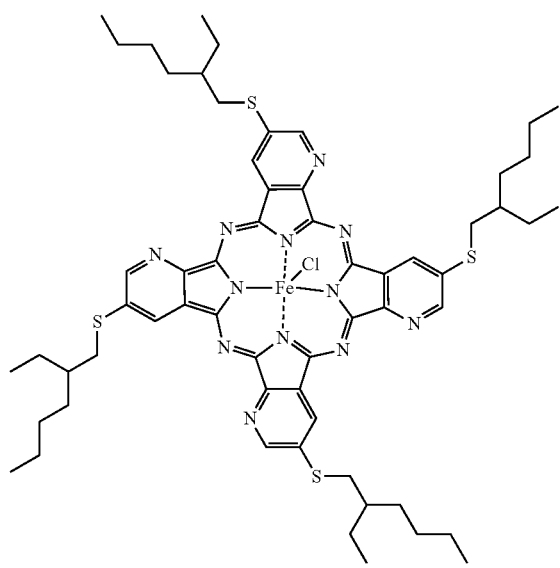
Compound (24)
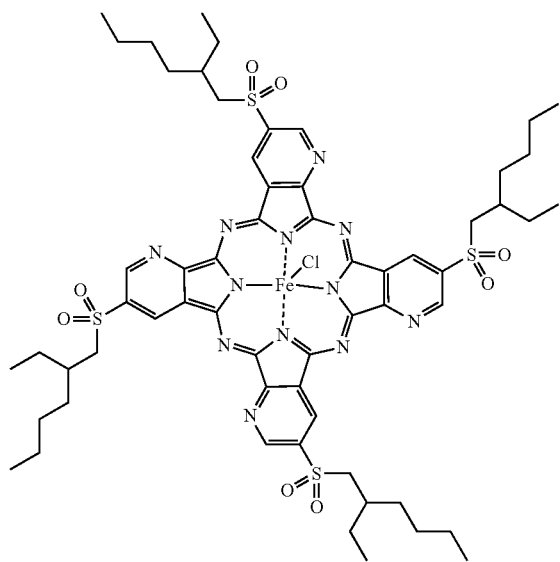
Compound (25)
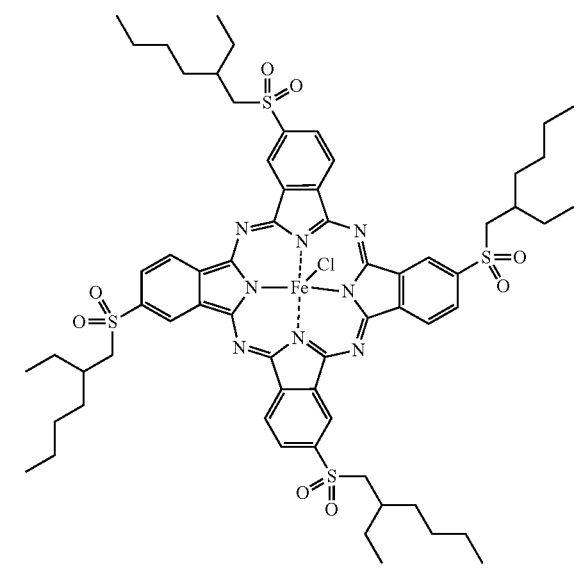
Compound (26)
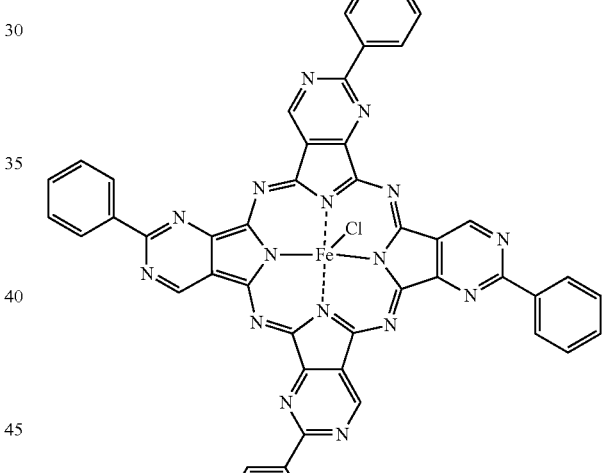
Compound (27)
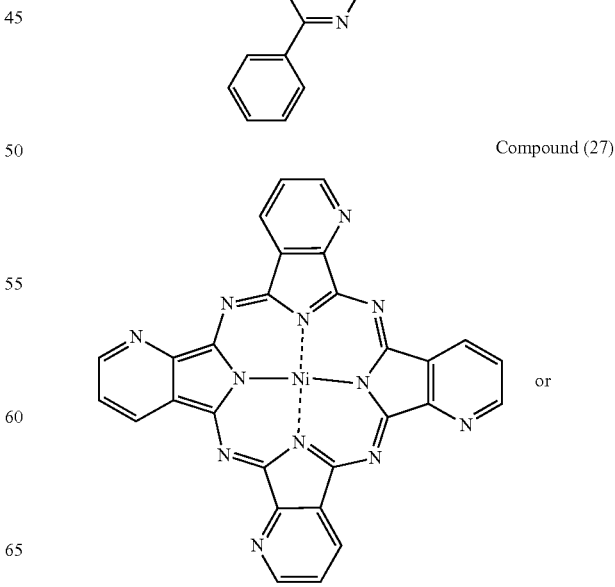
or -continued

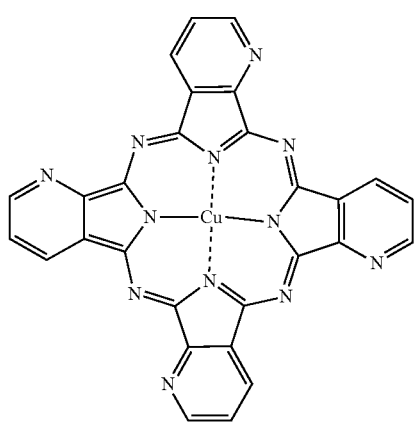

Compound (28)

A manufacturing method of a metal complex or an adduct thereof is not particularly limited, and for example, a method of heating a metal atom and a dicyano compound such as pyridine-2,3-dicarbonitrile in an alcohol solvent in a presence of a basic material is exemplified. Here, as the basic material, inorganic bases such as potassium carbonate, sodium carbonate, calcium carbonate, sodium hydrogen carbonate, and sodium acetate, and organic bases such as triethylamine, tributylamine, and diazabicycloundecene are exemplified.

Carbon Material

The carbon material is preferably derived from conductive carbon. As specific examples of the carbon material, activated carbon, Ketjen black, graphite, an amorphous carbon, graphene, carbon black, carbon fibers, mesocarbon microbeads, microcapsule carbon, fullerene, carbon nanoforms, carbon nanotubes, carbon nanohorns, and the like are exemplified. Of these, the carbon material is preferably activated carbon, Ketjen black, graphite, amorphous carbon, graphene, carbon black, carbon fibers, or fullerenes, and more preferably activated carbon, Ketjen black, or carbon fibers.

As the carbon nanotubes, single-walled carbon nanotubes (hereinafter referred to as "SWCNT"), double-walled carbon nanotubes (hereinafter referred to as "DWCNT"), and multi-walled carbon nanotubes (hereinafter referred to as "MWCNT") are exemplified.

The carbon material may have a heteroatom. As the heteroatom, an oxygen atom, a nitrogen atom, a phosphorus atom, a sulfur atom, a silicon atom, and the like are exemplified. When the carbon material has a heteroatom, the carbon material may contain one type of heteroatom alone, or may contain two or more types of heteroatoms. Further, the carbon material may be oxidized, hydroxylated, nitrided, phosphorized, sulfided, or silicified.

The carbon material may have a functional group such as a hydroxyl group, a carboxyl group, a nitrogen-containing group, a silicon-containing group, a phosphorus-containing group such as a phosphate group, a sulfur-containing group such as a sulfonate group, or the like. Particularly, the carbon material preferably has a carboxyl group. When the carbon material has a carboxyl group, since the metal complex or an adduct thereof is likely to be adsorbed on a surface of the carbon material, a pseudo-capacitance due to the metal complex or an adduct thereof is added, and a capacity of the capacitor can be increased.

The carbon material may be subject to a surface treatment by an oxidation treatment. Particularly, when the carbon material such as carbon black is subject to an oxidation treatment, an interaction with the metal complex can be improved by adding a hydrophilic functional group such as a carboxyl group or a hydroxyl group, and an ionization potential can be controlled within an optimum range. As a method of the oxidation treatment, a known method can be employed, and a wet treatment in which an aqueous solution of an oxidizing agent such as nitric acid, sulfuric acid, or chloric acid is agitated and mixed, or a gas-phase treatment such as a plasma treatment or an ozone treatment can be used.

When the carbon material contains a carboxyl group, a carboxyl group content is preferably 20% by mass or less, more preferably 15% by mass or less, and still more preferably 10% by mass or less with respect to 100% by mass of the carbon material. When the carboxyl group content is the above-described upper limit value or lower, it is advantageous because manufacturing costs of the capacitor are reduced. Also, the carboxyl group content is preferably 1% by mass or more, more preferably 5% by mass or more, and still more preferably 8% by mass or more. When the carboxyl group content is the above-described lower limit value or higher, the pseudo-capacitance due to the metal complex or an adduct thereof can be further increased. Further, the carboxyl group content can be measured by an elemental analysis, an X-ray photoelectron spectroscopy, or the like.

A specific surface area of the carbon material is preferably 0.8 m$^2$/g or more, more preferably 10 m$^2$/g or more, still more preferably 50 m$^2$/g or more, particularly preferably 100 m$^2$/g or more, and most preferably 500 m$^2$/g or more. When the specific surface area is 0.8 m$^2$/g or more, an amount of the metal complex or an adduct thereof adsorbed on a surface of the carbon material can be easily increased, and the pseudo-capacitance due to the metal complex or an adduct thereof can be further increased. Although the upper limit value of the specific surface area is not particularly limited, it can be, for example, 2000 m$^2$/g. Further, the specific surface area can be measured by a nitrogen adsorption BET method using a specific surface area measuring device.

An average particle size of the carbon material is not particularly limited, and is, for example, preferably 5 nm to 1000 μm, more preferably 10 nm to 100 μm, and still more preferably 50 nm to 10 μm. As a method for adjusting the average particle size of the carbon material to the numerical range described above, the following (A1) to (A3) are exemplified.

(A1): A method of pulverizing particles with a ball mill or the like, dispersing the obtained coarse particles in a dispersant to obtain a desired particle size, and then drying.

(A2): A method of pulverizing particles with a ball mill or the like and sorting out particle sizes by sieving the obtained coarse particles.

(A3): A method of optimizing manufacturing conditions to adjust particle sizes of particles when the carbon material is manufactured.

Further, the average particle size can be measured using a particle size distribution measuring device, an electron microscope, or the like.

An amount of the metal complex or an adduct thereof is preferably 50% by mass or less, more preferably 30% by mass or less, still more preferably 20% by mass or less, and most preferably 7% by mass or less with respect to 100% by mass of a total amount of the metal complex or an adduct thereof and the carbon material. When the amount of the metal complex or an adduct thereof is the above-described upper limit value or lower, conductivity of the metal complex or an adduct thereof and the carbon material is excellent. Also, the amount of the metal complex or an adduct thereof is preferably 0.1% by mass or more, more preferably 1% by mass or more, still more preferably 2% by mass or more, and most preferably 3% by mass or more with respect to 100% by mass of the total amount of the metal complex or an adduct thereof and the carbon material. When a proportion of the metal complex or an adduct thereof is the above-described lower limit value or higher, the pseudo-capacitance due to the metal complex or an adduct thereof can be further increased.

Electrode

At least one of the electrodes used in the capacitor of the present invention contains a conductive auxiliary agent, a thickener, a binder, a solvent, a conductive polymer, and the like as needed in addition to the metal complex or an adduct thereof and the carbon material.

As the conductive auxiliary agent, acetylene black, carbon black, Ketjen black, carbon whisker, carbon fibers, natural graphite, artificial graphite, and the like are exemplified. Of these, acetylene black and graphite are preferable as the conductive auxiliary agent.

An amount of the conductive auxiliary agent added is preferably 1 to 50% by mass, more preferably 5 to 40% by mass, and still more preferably 7.5 to 20% by mass with respect to a total mass of the electrode.

As the thickener, cellulose-based polymers such as carboxymethyl cellulose (CMC), methyl cellulose, and hydroxypropyl cellulose, and their ammonium salts, alkali metal salts, and the like are exemplified. Of these, CMC is preferable as the thickener.

An amount of the thickener added is preferably 0.1 to 10% by mass, more preferably 0.5 to 7% by mass, and still more preferably 1 to 5% by mass in terms of a solid content with respect to the total mass of the electrode.

Examples of the binder include a rubber-based resin such as styrene-butadiene rubber (SBR), a fluorine-based resin such as polytetrafluoroethylene (PTFE) and polyvinylidene fluoride (PVDF), a polyacrylic acid-based resin, a thermoplastic resin such as polyimide, polyamide imide, polyethylene (PE), and polypropylene (PP), and a cellulose-based resin such as carboxymethyl cellulose. Of these, SBR and PVDF are preferable as the binder.

An amount of the binder added is preferably 0.01 to 10% by mass, more preferably 0.1 to 5% by mass, and still more preferably 0.5 to 3% by mass in terms of a solid content with respect to the total mass of the electrode.

According to one embodiment of the present invention, CMC may be used as both the thickener and the binder.

As the solvent, water or the like is exemplified.

An amount of the solvent added is preferably 0 to 50% by mass, more preferably 0 to 40% by mass, and still more preferably 0 to 25% by mass with respect to the total mass of the electrode. According to one embodiment of the present invention, at least one of the electrodes used in the capacitor of the present invention does not contain a solvent.

Examples of the conductive polymer include a fluorine resin film having a sulfone group or a carboxyl group, and polyaniline, polypyrrole, polythiophene, PEDOT, and the like which are polymers having a conjugated bond in a molecule. Of these, a perfluorosulfonic acid polymer such as Nafion, and polypyrrole are preferable as the conductive polymer. According to one embodiment of the present invention, at least one of the electrodes used in the capacitor of the present invention contains an ionomer to further improve the capacity of the capacitor.

An amount of the conductive polymer added is preferably 0 to 10% by mass, more preferably 0 to 7.5% by mass, and still more preferably 0 to 5% by mass with respect to the total mass of the electrode. According to one embodiment of the present invention, at least one of the electrodes used in the capacitor of the present invention does not contain a conductive polymer.

A manufacturing method of the electrode is not particularly limited, and, for example, may be manufactured by applying a coating solution prepared by mixing an active material, in which the metal complex or an adduct thereof is adsorbed on a carbon material, and, if necessary, the conductive auxiliary agent, the thickener, the binder, the solvent, and the like onto a surface of a current collector foil, and then removing components other than the active material. When components other than the active material are removed, drying by heating may be performed, or pressing may be performed after drying. Also, a layer containing the active material (that is, an active material layer) may be provided on the surface of the current collector foil by vacuum deposition or the like. The electrode may have the active material layer only on one surface of the current collector foil or on both surfaces of the current collector foil.

The current collector foil is not particularly limited, and examples thereof include an aluminum foil, an electrolytic aluminum foil, an aluminum mesh (expanded metal), foamed aluminum, perforated aluminum, an aluminum alloy such as duralumin, a copper foil, an electrolytic copper foil, a copper mesh (expanded metal), foamed copper, perforated copper, a copper alloy such as brass, a brass foil, a brass mesh (expanded metal), foamed brass, perforated brass, a nickel foil, a nickel mesh, corrosion-resistant nickel, nickel mesh (expanded metal), perforated nickel, foamed nickel, sponge nickel, metallic zinc, corrosion-resistant metallic zinc, a zinc foil, a zinc mesh (expanded metal), a steel plate, a perforated steel plate, silver, and the like. Also, a substrate-shaped current collector foil such as a silicon substrate, a metal substrate such as gold, iron, stainless steel, copper, aluminum, lithium, or the like, an alloy substrate containing any combination of these metals, an oxide substrate such as indium tin oxide (ITO), indium zinc oxide (IZO), antimony tin oxide (ATO), or the like, and a carbon substrate such as glassy carbon, pyrolytic graphite, carbon felt, or the like can be used. According to one embodiment of the present invention, the current collector foil may be an etched aluminum foil.

A thickness of the active material layer is not particularly limited, and can be, for example, 0.01 to 100 µm. If the thickness of the active material layer is the above-described lower limit value or higher, a capacity density is excellent. If the thickness of the active material layer is the above-described upper limit value or lower, performance of the electrode is less likely to deteriorate.

The electrode paired with the electrode containing the metal complex or an adduct thereof and the carbon material of the present invention may be an electrode containing the metal complex or an adduct thereof and the carbon material, or may be an electrode that does not contain the metal complex or an adduct thereof and the carbon material. As the electrode that does not contain the metal complex or an adduct thereof and the carbon material, for example, one prepared by mixing the above-described conductive auxiliary agent and, if necessary, the thickener, the binder, and the solution, applying it on the current collector foil, drying it, and if necessary, performing pressurization, heating, or the like can be mentioned.

Electrolyte

The capacitor of the present invention contains an electrolyte. The electrolyte may be a liquid or a solid. Of these, the electrolyte is preferably a liquid electrolyte.

As the liquid electrolyte, an organic electrolytic solution, an aqueous electrolytic solution, an ionic liquid, or the like is exemplified. Of these, an organic electrolytic solution is preferable as the liquid electrolyte. The organic electrolytic solution includes one or more organic solvents in which one or more salts are dissolved.

Examples of the organic solvent include a linear alkyl carbonate, a linear alkylene carbonate, a cyclic carbonate, a cyclic ester, a linear ester, a cyclic ether, alkyl ether, nitrile, sulfone, sulfolane, siloxane, sultone, and the like. According to one embodiment of the present invention, a mixture of any two or more of the types described above may be used as the liquid electrolyte. Of these, a cyclic ester, a linear alkyl carbonate, and a cyclic carbonate are preferable as the organic solvent.

As the salts dissolved in the organic solvent, a quaternary ammonium salt, a quaternary phosphonium salt, and the like are exemplified. According to one embodiment of the present invention, the electrolyte is one in which tetraethylammonium tetrafluoroborate $((C_2H_5)_4NBF_4)$ is dissolved in a propylene carbonate (PC) solvent.

According to one embodiment of the present invention, the capacitor of the present invention includes a pair of electrodes, an electrolyte, a separator, a laminated film, and a tab lead (terminal). In the capacitor of the present invention, a configuration other than the electrode may be the same as a configuration of a general capacitor.

As the separator, it can be appropriately selected from known separators and used. Examples of the separator include a cellulose-based base material such as mixed paper of cellulose and polyester or the like, a porous film base material such as polypropylene, polyethylene, polyethylene terephthalate, rayon, polybutylene terephthalate, polyphenylene sulfide, or the like, a glass fiber base material, one in which these are combined into a plurality of layers, or the like.

Composite Material for Capacitor

The electrode contained in the capacitor of the present invention preferably includes a composite material for a capacitor containing the metal complex or an adduct thereof represented by the above-described expression (1) or (2) and the above-described carbon material.

According to one embodiment of the present invention, the composite material for a capacitor of the present invention has a capacitance density of 20 $F/cm^3$ or more, preferably 25 $F/cm^3$ or more, more preferably 30 $F/cm^3$ or more, and still more preferably 40 $F/cm^3$ or more. The composite material for a capacitor of the present invention has a capacitance density within the above-described range, and therefore has a higher capacity than a composite material used for a conventional capacitor in which only a porous carbon is used.

Manufacturing Method of Composite Material for Capacitor

The present invention also provides a manufacturing method of the above-described composite material for a capacitor. According to one embodiment of the present invention, the manufacturing method of the composite material for a capacitor includes (a) a step of preparing a solution by dissolving the metal complex or an adduct thereof in a solvent, (b) a step of preparing a dispersion liquid by dispersing the carbon material in the solution, and (c) a step of removing the solvent from the dispersion liquid.

Step (a) is a step of dissolving the metal complex or an adduct thereof in a solvent to prepare a solution. The solution includes the metal complex or an adduct thereof dissolved in the solvent and the solvent. Conditions such as a temperature and a pressure when the solution is prepared are not particularly limited as long as it is a condition in which the metal complex or an adduct thereof can be dissolved in the solvent. For example, the temperature at which the solution is prepared is preferably a temperature below a boiling point of the solvent, more preferably from 5 to 80° C., and still more preferably from 10 to 50° C. Most preferably, the solution is prepared at room temperature (25° C.). Also, regarding the pressure, the solution can be prepared, for example, under the atmospheric pressure.

The solvent is not particularly limited as long as it is a solvent capable of dissolving the metal complex or an adduct thereof. A solubility of the metal complex or an adduct thereof with respect to the solvent is preferably 0.1 g/L or more, more preferably 0.4 g/L or more, still more preferably 2.0 g/L or more, and particularly preferably 10 g/L or more. An upper limit value of the solubility of the metal complex or an adduct thereof is not particularly limited and may be, for example, 20 g/L or less, preferably 50 g/L or less, and more preferably 100 g/L or less. When the solubility of the metal complex or an adduct thereof is the above-described lower limit value or higher, the metal complex or an adduct thereof is likely to be dissolved in the solvent, and the metal complex or an adduct thereof is likely to be more uniformly adsorbed on a surface of the carbon material. As a result, the pseudo-capacitance due to the metal complex or an adduct thereof can be increased, and a capacitance of the capacitor can be increased.

The solubility of the metal complex or an adduct thereof with respect to the solvent is usually a maximum value of a dissolution amount (g) of the metal complex or an adduct thereof per 1 L of the solvent measured using an ultraviolet-visible spectroscopy at 25° C. under the atmospheric pressure. Further, conditions for measuring the solubility of the metal complex or an adduct thereof with respect to the solvent are irrelevant to the conditions when the solution is prepared.

Step (b) is a step of dispersing the carbon material in the solution to prepare a dispersion liquid, and, in this step, the metal complex or an adduct thereof can be adsorbed on the surface of the carbon material to form a complex. That is, the dispersion liquid contains the complex in which the metal complex or an adduct thereof is adsorbed on the surface of the carbon material. Conditions such as a temperature and a pressure when the dispersion liquid is prepared are not particularly limited as long as it is a condition in which the carbon material can be dispersed. For example, the temperature at which the dispersion liquid is prepared is preferably a temperature below a boiling point of the solvent, more preferably 5 to 80° C., and still more preferably 10 to 50° C. Most preferably, the dispersion liquid is prepared at room temperature (25° C.).

Step (c) is a step of removing the solvent from the dispersion liquid, and is a step of obtaining the complex in which the metal complex or an adduct thereof is adsorbed on the surface of the carbon material as an active material. A method for removing the solvent from the dispersion liquid is not particularly limited, and it can be removed by, for example, solid-liquid separation. As a method of the solid-liquid separation, filtration is preferable because it reduces a temperature load on the active material. In the filtration, absorbance of a filtrate is preferably reduced by 10% or more compared to the solution. Thereby, it can be determined that the metal complex or an adduct thereof is effectively adsorbed on the carbon material.

The manufacturing method of the composite material for a capacitor of the present invention is useful because the complex of the metal complex or an adduct thereof and the carbon material can be formed without subjecting it to a high-temperature heat treatment. The manufacturing method of the composite material for a capacitor of the present invention can be performed at 200° C. or lower, preferably 100° C. or lower, and more preferably 50° C. or lower. Since the metal complex or an adduct thereof of the present invention has a relatively high solubility with respect to the solvent, it can be present in the solvent at a high concentration. Also, since the metal complex or an adduct thereof has a high affinity with the carbon material, it can be effectively adsorbed on the surface of the carbon material. For example, the metal complex or an adduct thereof can form a molecular layer of the metal complex or an adduct thereof that is adsorbed on the surface of the carbon material in a monomolecular state.

In the manufacturing method of the composite material for a capacitor of the present invention, each step may be an independent step, or a plurality of steps may be integrated. For example, step (a) and step (b) may each be an independent step, or may be performed simultaneously as the same step.

EXAMPLES

Hereinafter. the present invention will be described in more detail using examples and comparative examples, but the scope of the present invention is not limited to the examples.

Example 1

In order to evaluate characteristics of a capacitor, a cell was prepared by the following steps.

Synthesis of Metal Complex

Synthesis of Compounds (8) and (9)

[1] Synthesis of 5,6-dimethyl-2,3-pyrazinedicarbonitrile 10 mL of acetic acid was added to 3.24 g of diaminomaleonitrile, 2.64 mL of diacetyl was additionally added, and the mixture was heated and refluxed for 1 hour. When the mixture was cooled, crystals were precipitated. 10 mL of water was added thereto, and crystals were collected by filtration. An object material was obtained by performing water washing and drying. A yield thereof was 4.45 g.

[2] Synthesis of Compound (9)

30 mL of 1-pentanol was added to 6.32 g of 5,6-dimethyl-2,3-pyrazinedicarbonitrile, 1.78 g of anhydrous ferric chloride and 1.9 mL of 4-methylpyridine were additionally added, and the mixture was heated in an oil bath set at 145° C. to perform a reaction thereof. After the reaction for 5 hours, heating was stopped. At a time point at which a temperature of the reaction solution has reached 100° C., 30 mL of methanol was added dropwise. After allowing it to be cooled to room temperature, it was filtered under a reduced pressure, carefully washed with water and methanol, then washed with acetone, and dried. A yield thereof was 6.8 g.

[3] Synthesis of Compound (8)

1.8 g of the compound (9) was taken, 20 mL of concentrated sulfuric acid was added thereto, and the mixture was agitated at room temperature. After 1 hour, the mixture was added to 200 mL of water dropwise. A precipitated solid was taken out by centrifugal separation, and the obtained solid was washed with water and methanol using a centrifuge to obtain the compound (8). A yield thereof was 1.0 g.

Preparation of Electrode 0.5 mg of the compound (8) was dissolved in 1.0 mL of DMSO (dimethyl sulfoxide) to prepare a solution in which a concentration of the compound (8) was 0.5 g/L. 10 mg of activated carbon was dispersed in the obtained solution. During the dispersion, an ultrasonic treatment (20 kHz) was performed for 15 minutes. The DMSO serving as a solvent was removed from the obtained dispersion liquid by solid-liquid separation and methanol washing, and then was dried at room temperature for 24 hours to obtain an active material of example 1.

Next, acetylene black (manufactured by Kishida Chemical Co., Ltd.) was prepared as a conductive auxiliary agent, SBR (SBR TRD-102A manufactured by JSR Corporation) was prepared as a binder, CMC (MAC350H manufactured by Nippon Paper Industries) was prepared as a thickener, and the acetylene black, the SBR, and the CMC were added to 10 g of the active material of example 1 and kneaded. A mixing ratio of each material was as follows.

Active material: 85.9% by mass
Acetylene black: 10.1% by mass
CMC: 2.5% by mass
SBR: 1.5% by mass Next, a coating solution was applied to an etched aluminum foil having a thickness of 30 μm and was dried. Conditions of the electrode coating and drying were as follows.

Coating speed: 0.5 m/min
Drying temperature: 120° C.
Drying time: 10 minutes

As a result of the electrode coating and drying, an electrode having a dry film thickness of 98 μm and an adhesion amount of 5.26 mg/cm$^2$ was obtained.

Preparation of Laminated Cell

A vacuum constant temperature dry oven VOS-301SD manufactured by EYELA was used to perform a vacuum drying treatment of the electrode and a separator (FPC3018 manufactured by Mitsubishi Paper Mills Limited) at −80 kPa or less. The vacuum drying treatment was performed under the following conditions.

Degree of vacuum: −80 kPa or less
Drying temperature: 120° C.
Drying time: 12 hours The vacuum-dried electrode and separator, and a protective PP plate were slit. Next, the slit material was fixed to a cell having characteristics described below to prepare a single-layer laminated cell.

Cell shape: Laminated A type
Laminated film: Manufactured by Thank Metal Co., Ltd. and a thickness of 110 μm Cell assembly: 4 levels, 8 cells in total, and a single layer cell Next, the three-side sealed single-layer laminated cell was vacuum-dried under a condition at 60° C. for 5 hours.

Next, 1 mol/L of $(C_2H_5)_4NBF_4$ (PC solvent) was injected, as an electrolytic solution, into the laminated cell that has been vacuum-dried to cause the electrode to be impregnated. The impregnation was performed once under conditions of −80 kPa and 15 minutes.

Next, the laminated cell that has ended the injection and impregnation was immediately vacuum-sealed to seal the laminated cell.

Comparative Example 1

Using activated carbon not containing the compound (8) as an active material of comparative example 1 instead of the active material of example 1 described above, a cell was prepared by the following steps.

Preparation of Electrode

First, acetylene black (manufactured by Kishida Chemical Co., Ltd.) was prepared as a conductive auxiliary agent, SBR (SBR TRD-102A manufactured by JSR Corporation) was prepared as a binder, CMC (MAC350H manufactured by Nippon Paper Industries) was prepared as a thickener, and the acetylene black, the SBR, and the CMC were added to 10 g of the active material of comparative example 1 and kneaded.

A mixing ratio of each material was as follows.
Active material: 85.0% by mass
Acetylene black: 10.0% by mass
CMC: 3.5% by mass
SBR: 1.5% by mass Next, a coating solution was applied to an etched aluminum foil having a thickness of 30 μm and was dried. Conditions of the electrode coating and drying were as follows.

Coating speed: 0.5 m/min
Drying temperature: 120° C.
Drying time: 10 minutes

As a result of the electrode coating and drying, an electrode having a dry film thickness of 100 μm and an adhesion amount of 5.31 mg/cm² was obtained.

Preparation of Laminated Cell

A vacuum constant temperature dry oven VOS-301SD manufactured by EYELA was used to perform a vacuum drying treatment of the electrode and a separator (FPC3018 manufactured by Mitsubishi Paper Mills Limited) at −80 kPa or less. The vacuum drying treatment was performed under the following conditions.

Degree of vacuum: −80 kPa or less
Drying temperature: 120° C.
Drying time: 12 hours The vacuum-dried electrode, the separator, and a protective PP plate were slit. Next, the slit material was fixed to a cell having characteristics described below to prepare a single-layer laminated cell.

Cell shape: Laminated A type
Laminated film: Manufactured by Thank Metal Co., Ltd. and a thickness of 110 μm
Cell assembly: 4 levels, 8 cells in total, and a single layer cell Next, the three-side sealed single-layer laminated cell was vacuum-dried under a condition at 60° C. for 5 hours.

Next, 1 mol/L of $(C_2H_5)_4NBF_4$ (PC solvent) was injected, as an electrolytic solution, into the laminated cell that has been vacuum-dried to cause the electrode to be impregnated. The impregnation was performed once under conditions of −80 kPa and 15 minutes.

Next, the laminated cell that has ended the injection and impregnation was immediately vacuum-sealed to seal the laminated cell.

Evaluation of Capacitor Characteristics

Using the cells prepared in example 1 and comparative example 1, charge/discharge tests were performed under the following conditions.

(1) Equipment Used
SD8 manufactured by Hokuto Denko
(2) Discharge Conditions
Charging: CC charging to 2.5 V at 0.5 mA/cm²
Discharging: CC discharging to 0 V at 0.5 mA/cm²
Downtime: 1 sec
Number of cycles: 100 cycles
Measurement temperature: 25° C.
(3) Cells Put into Execution
Example: 3 cells, Comparative example: 2 cells Result of the charge/discharge tests are shown in FIG. 1. As shown in FIG. 1, compared to the capacitor (comparative example 1) using only the activated carbon as an active material, the capacitor (example 1) of the present invention containing the compound (8) had a higher capacity.

For the composite material for a capacitor and the activated carbon that were respectively used for the electrodes of example 1 and comparative example 1, cyclic voltammogram (CV) measurement was performed under the following conditions. Result of the CV measurement are shown in FIG. 2.

Sweep rate: 0.01 V/sec
Potential range: −0.8 to 1.4 (V vs NHE)

Capacity characteristics were measured while changing a potential in the potential range described above.

Figure 2:
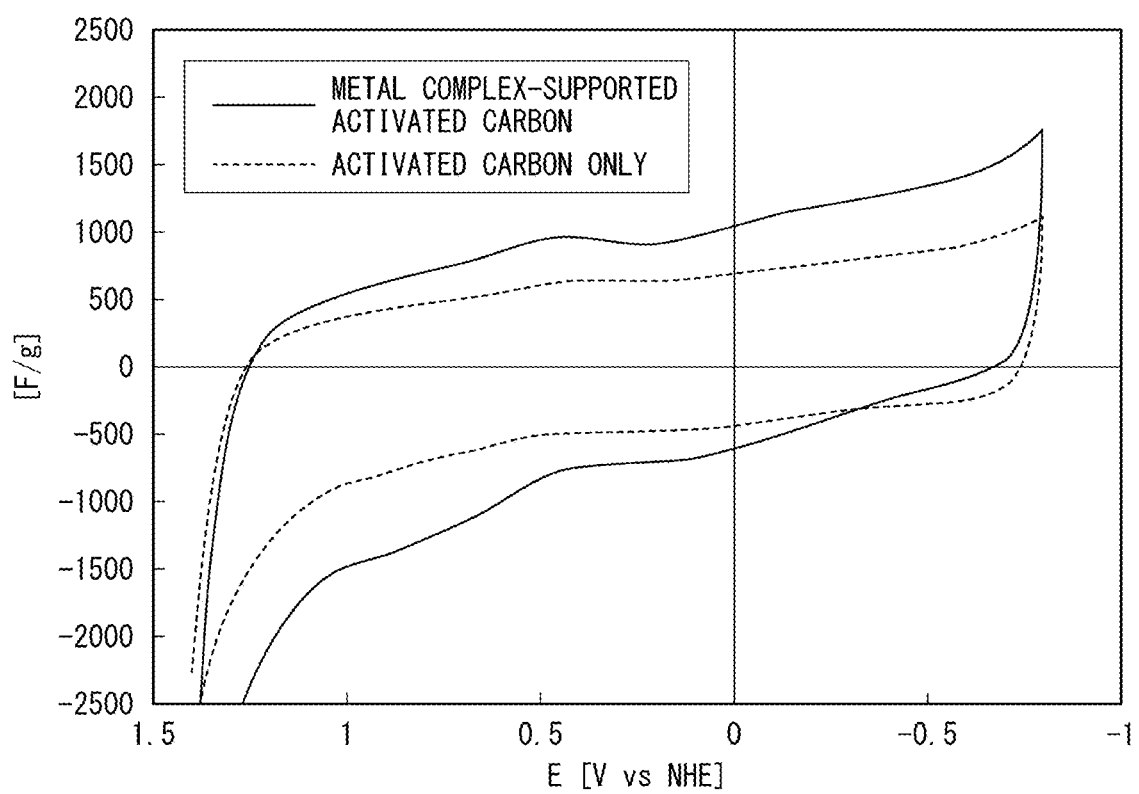
FIG. 2 is a graph showing a capacitance density with respect to E (V vs NHE) for a composite material for a capacitor of the present invention.

As shown in FIG. 2, compared to comparative example 1 in which only the activated carbon was used as an active material, the composite material for a capacitor of the present invention (example 1) had a higher capacity.

Example 2

In order to evaluate characteristics of a capacitor, a cell was prepared by the following steps.

Preparation of Electrode

After preparing and mixing activated carbon and a compound (16) as an active material, acetylene black as a conductive auxiliary agent, and polyvinylidene fluoride (PVDF) as a binder, the mixture was appropriately diluted with N-methyl-2-pyrrolidone (NMP) to obtain a slurry. A mixing ratio of each material was as follows.

Activated carbon: 72.0% by mass
Acetylene black: 10.0% by mass
PVDF: 10.0% by mass
Compound (16): 8.0% by mass Next, a coating solution was applied to a SUS304 foil having a thickness of 30 μm that has been surface-treated with 6M HCl and was dried. Conditions of the electrode coating and drying were as follows.

Coating speed: 1.2 m/min
Drying temperature: 60° C.
Drying time: 2 hours

As a result of the electrode coating and drying, an electrode having a dry film thickness of 26 μm and an adhesion amount of 1.2 mg/cm² was obtained.

Preparation of Laminated Cell

The electrode was slit to 2 cm×2 cm, and a separator and a protective PP plate were slit together. Next, the slit material was fixed to a cell to prepare a single-layer laminated cell.

Next, 1 ml of $H_2SO_4$ of 1 mol/L was injected, as an electrolytic solution, into the laminated cell to cause the electrode to be impregnated. The impregnation was performed once under conditions of −80 kPa and 1 minute.

Next, the laminated cell that has ended the injection and impregnation was immediately vacuum-sealed to seal the laminated cell.

Comparative Example 2

An electrode not containing the compound (16) was prepared instead of the electrode of example 2 described above, and a cell was prepared by the following steps.

Preparation of Electrode

After preparing and mixing activated carbon as an active material, acetylene black as a conductive auxiliary agent, and PVDF as a binder, the mixture was appropriately diluted with NMP to obtain a slurry. A mixing ratio of each material was as follows.

Activated carbon: 80.0% by mass
Acetylene black: 10.0% by mass
PVDF: 10.0% by mass Next, a coating solution was applied to a SUS304 foil having a thickness of 30 μm that has been surface-treated with 6M HCl and was dried. Conditions of the electrode coating and drying were as follows.

Coating speed: 1.2 m/min
Drying temperature: 60° C.
Drying time: 2 hours

As a result of the electrode coating and drying, an electrode having a dry film thickness of 26 μm and an adhesion amount of 1.2 mg/cm² was obtained.

Preparation of Laminated Cell

The electrode was slit to 2 cm×2 cm, and a separator and a protective PP plate were slit together. Next, the slit material was fixed to a cell to prepare a single-layer laminated cell.

Next, 1 ml of $H_2SO_4$ of 1 mol/L was injected, as an electrolytic solution, into the laminated cell to cause the electrode to be impregnated. The impregnation was performed once under conditions of −80 kPa and 1 minute.

Next, the laminated cell that has ended the injection and impregnation was immediately vacuum-sealed to seal the laminated cell.

Evaluation of Capacitor Characteristics

Using the cells prepared in example 2 and comparative example 2, charge/discharge tests were performed under the following conditions.

Charge/Discharge Conditions
Charging: CC charging to 1.0 V at 5 mA/cm²
Discharging: CC discharging to −0.2 V at 5 mA/cm²
Downtime: 1 sec
Number of cycles: 1000 cycles
Measurement temperature: 25° C.

Figure 3:
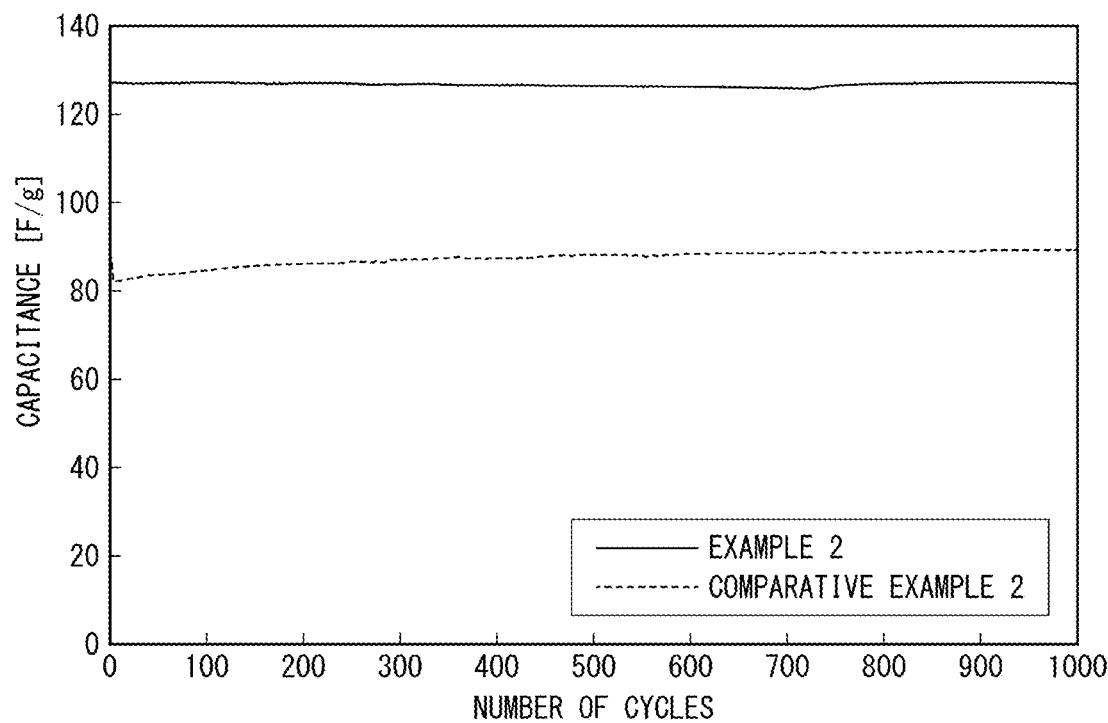
FIG. 3 is a graph showing results of charge/discharge tests of example 2 and comparative example 2.

Results of the charge/discharge tests are shown in FIG. 3. As shown in FIG. 3, compared to the capacitor (comparative example 2) using only the activated carbon as an active material, the capacitor (example 2) of the present invention containing the compound (16) had a higher capacity and maintained a capacity thereof even after 1000 cycles.

Using the cells prepared in example 2 and comparative example 2, cyclic voltammogram (CV) measurement was performed under the following conditions.

Sweep rate: 0.1 V/sec
Potential range: −0.2 to 1.0 (V)

Capacity characteristics were measured while changing a potential within the potential range described above.

Figure 4:
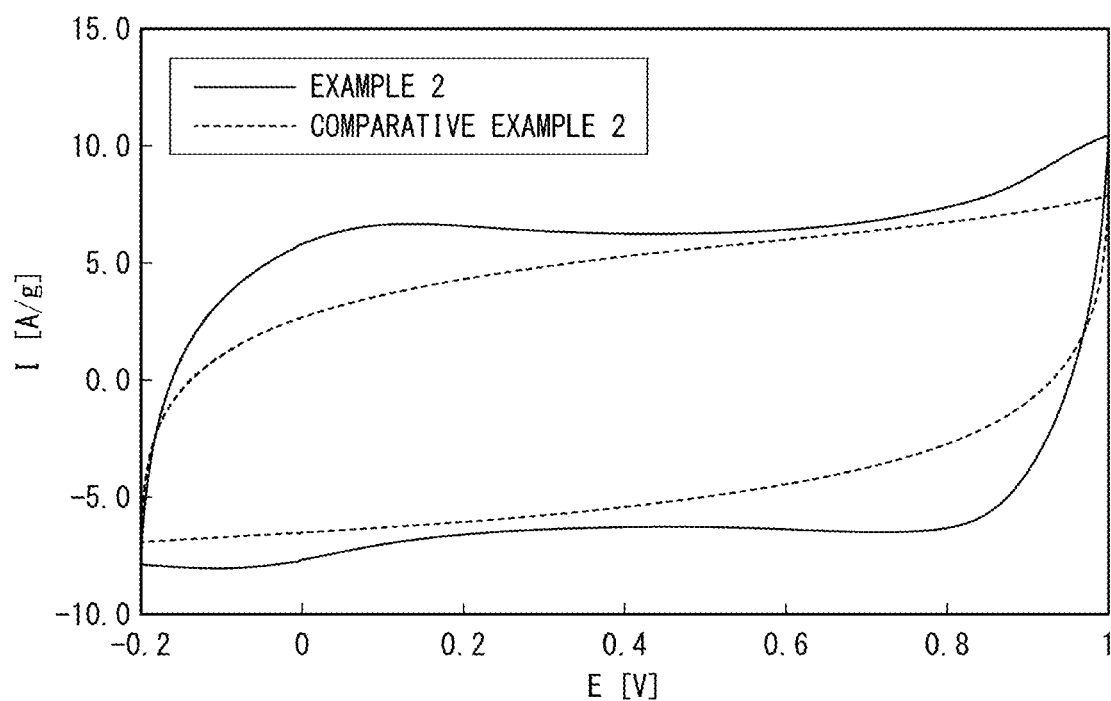
FIG. 4 is a graph showing results of cyclic voltammogram (CV) measurement of example 2 and comparative example 2.

Results of the CV measurement are shown in FIG. 4. As shown in FIG. 4, compared to the capacitor (comparative example 2) using only the activated carbon as an active material, the capacitor (example 2) of the present invention containing the compound (16) had a higher capacity.

Using the cells prepared in example 2 and comparative example 2, galvanostatic charge/discharge (GCD) measurement was performed under the following conditions to compare output characteristics.

Charge/Discharge Conditions
Charging: CC charging to 1.0 V at 1, 2, 5, 10, and 20 mA/cm²
Discharging: CC discharging to −0.2 V at 1, 2, 5, 10, and 20 mA/cm²
Measurement temperature: 25° C.

Figure 5:
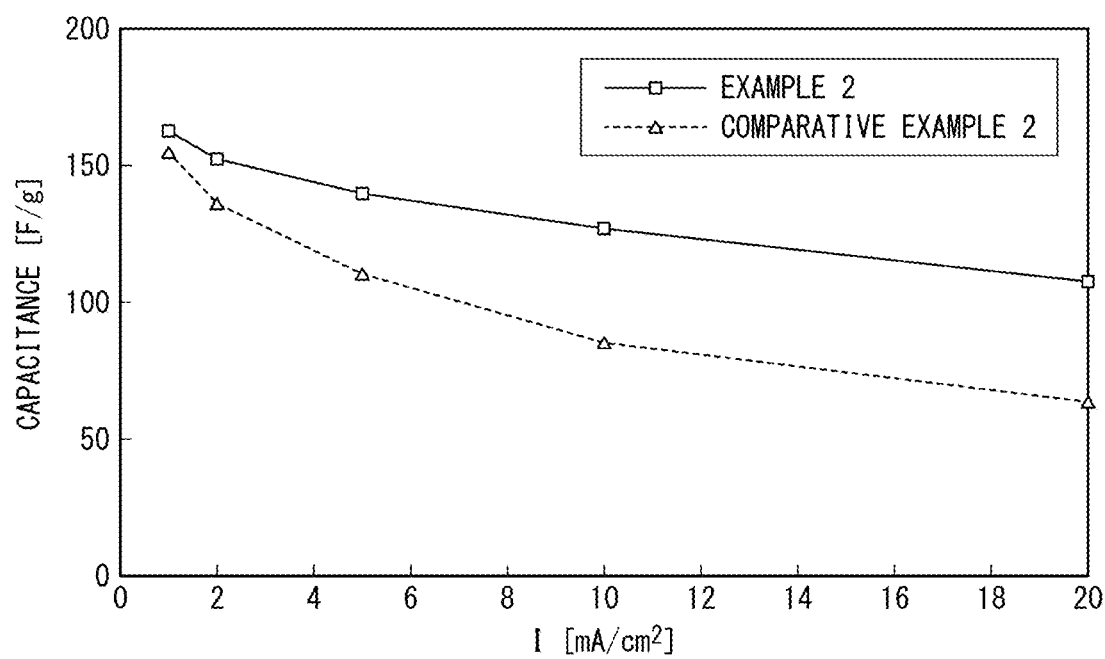
FIG. 5 is a graph showing results of galvanostatic charge/discharge (GCD) measurement of example 2 and comparative example 2.

Results of the GCD measurement are shown in FIG. 5. As shown in FIG. 5, compared to the capacitor (comparative example 2) using only the activated carbon as an active material, the capacitor (example 2) of the present invention containing the compound (16) was shown to have a higher output characteristics.

INDUSTRIAL APPLICABILITY

The capacitor of the present invention is useful because it has a high capacity when used as a capacitor for electric vehicles. Also, since the capacitor of the present invention does not use a rare metal, manufacturing costs can be reduced and manufacturing processes suitable for mass production can be designed. Also, since the metal complex or an adduct thereof of the present invention is easily adsorbed on a carbon material, a composite material for a capacitor having a high capacity can be manufactured without going through a complicated and expensive manufacturing processes.

The invention claimed is:

1. A capacitor comprising a pair of electrodes and an electrolyte, wherein at least one of the electrodes contains a metal complex or an adduct thereof and a carbon material which are represented by the following expression (1) or (2),

[Chem. 1]

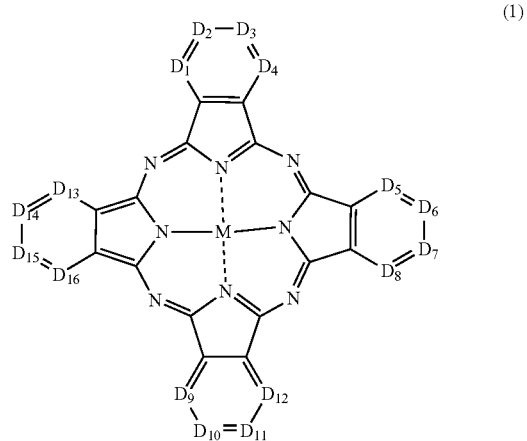

(1)

(2)

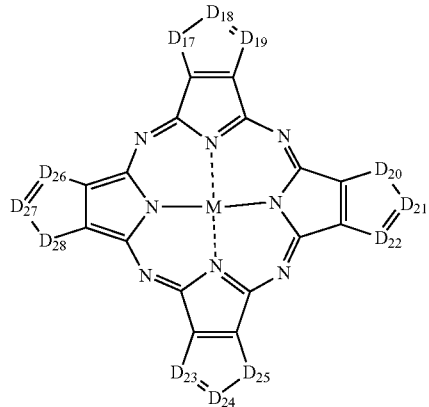

(In the expression,

M is a metal atom, $D^1$ to $D^{28}$ are each independently a nitrogen atom, a sulfur atom, or a carbon atom, and if $D^1$ to $D^{28}$ are carbon atoms, the carbon atoms may each be independently bonded to a hydrogen atom, a halogen atom, an alkyl group, a cycloalkyl group, an alkenyl group, an alkynyl group, an aryl group, an alkylsulfonyl group, an alkoxy group, or an alkylthio group).

2. The capacitor according to claim 1, wherein, in expression (1) or (2), M is a manganese atom, an iron atom, a cobalt atom, a nickel atom, a copper atom, or a zinc atom.

3. The capacitor according to claim 1, wherein, in expression (1) or (2), $D^1$ to $D^{16}$ are nitrogen atoms or carbon atoms.

4. The capacitor according to claim 1, wherein, in expression (1) or (2), $D^{17}$ to $D^{28}$ are sulfur atoms or carbon atoms.

5. The capacitor according to claim 1, wherein the metal complex or an adduct thereof is represented by the following expressions,

[Chem. 2]

Compound (1)

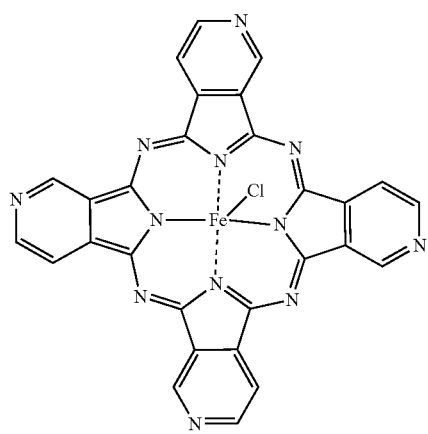

Compound (2)

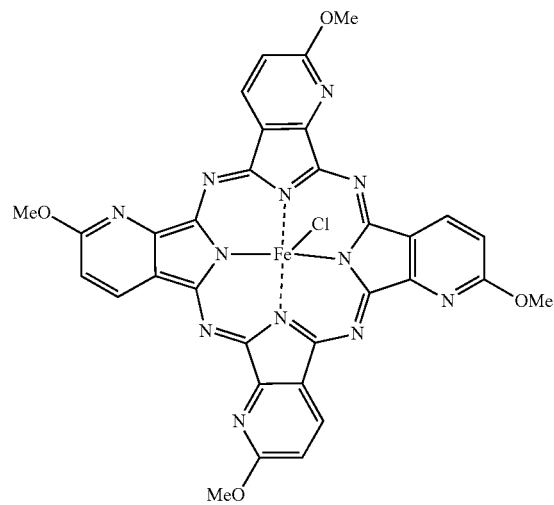

Compound (3)

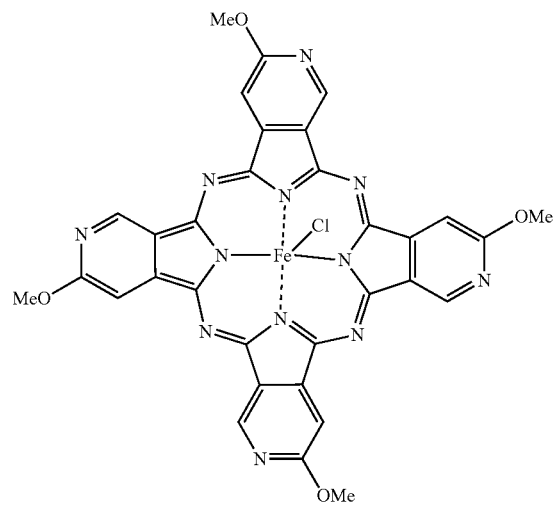

Compound (4)

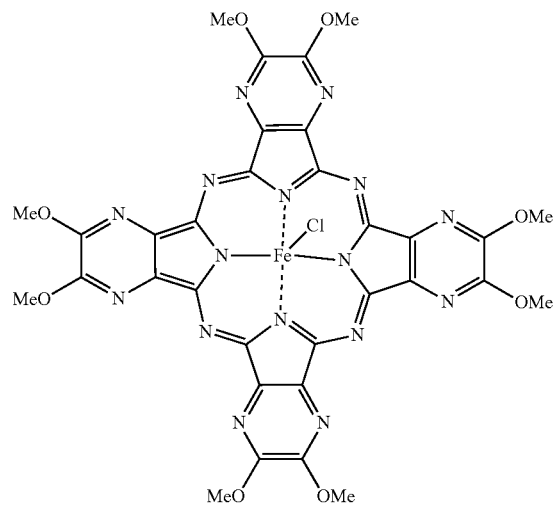

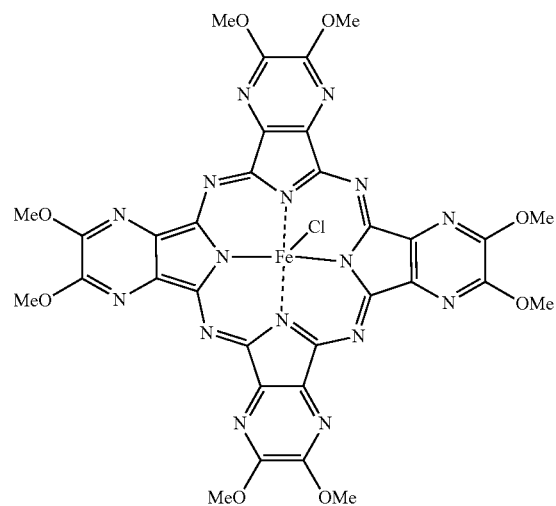

-continued
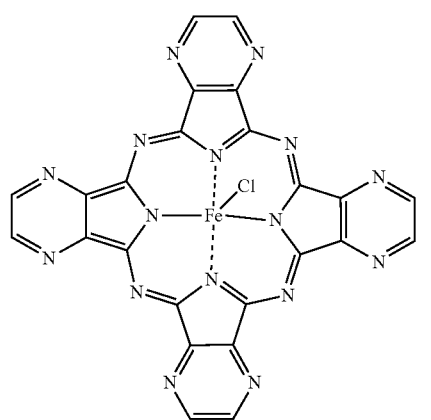
Compound (10)
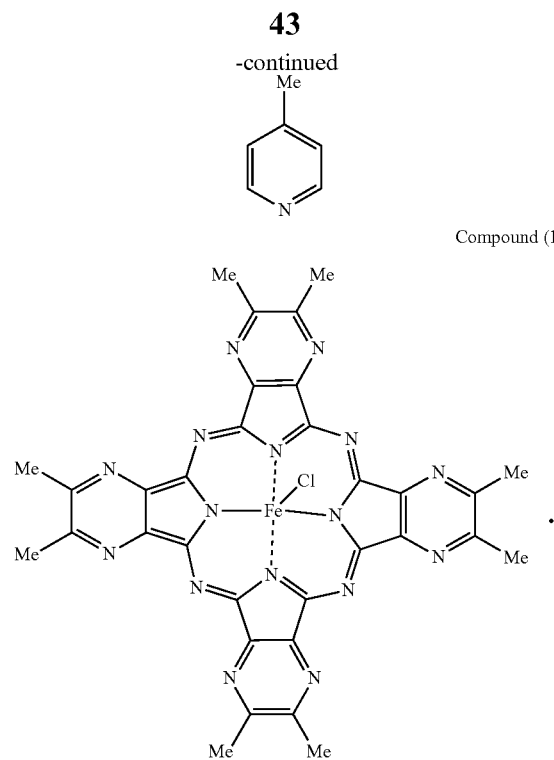
[Chem. 4]
Compound (12)
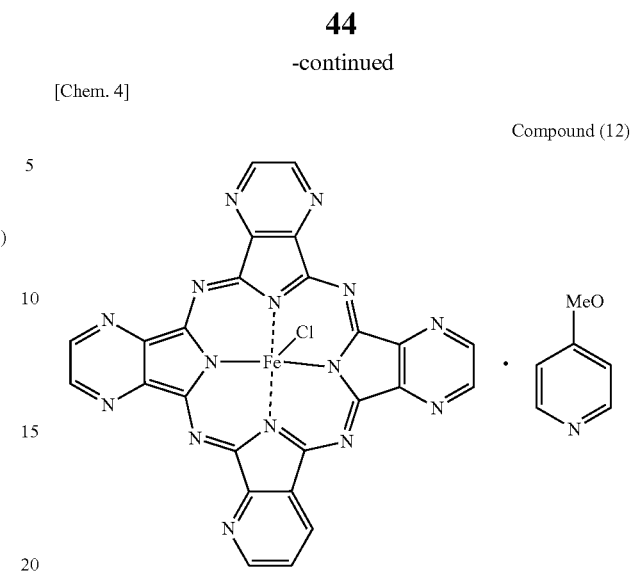
Compound (13)
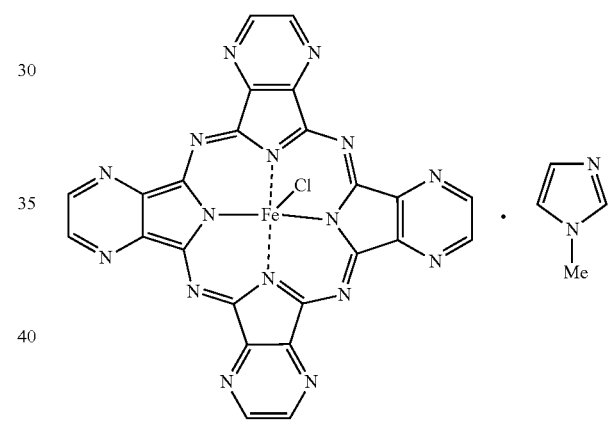
Compound (11)
Compound (14)
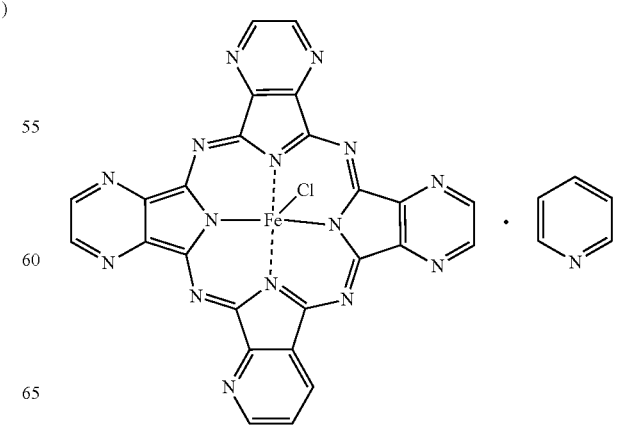

Compound (15)
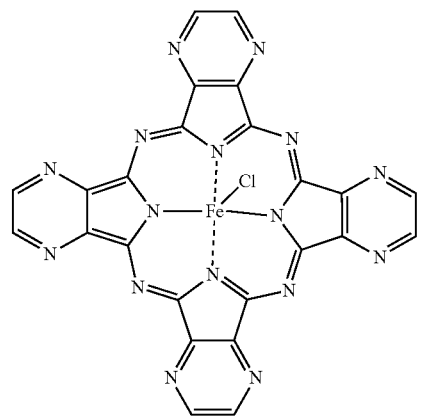
Compound (16)
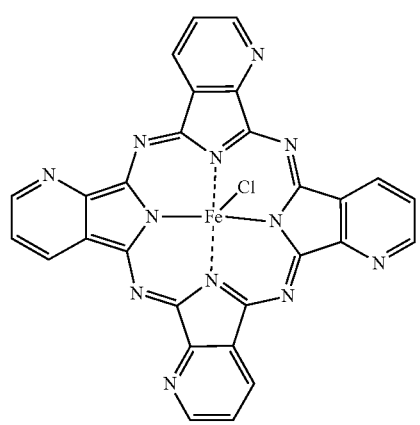
[Chem. 5]
Compound (17)
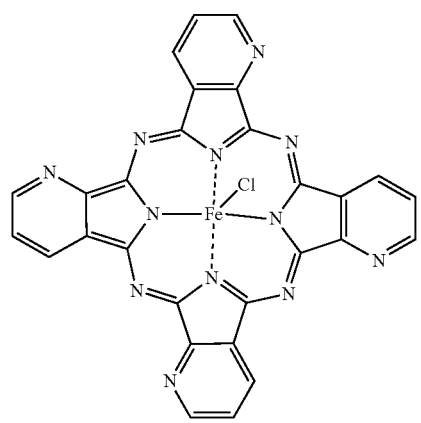
Compound (18)
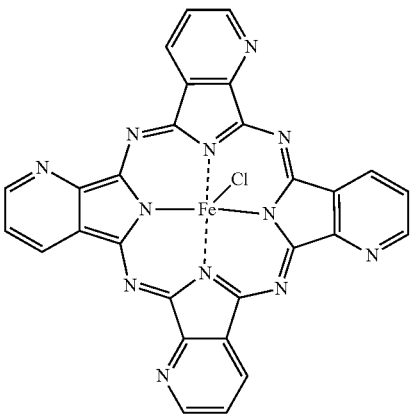
Compound (19)
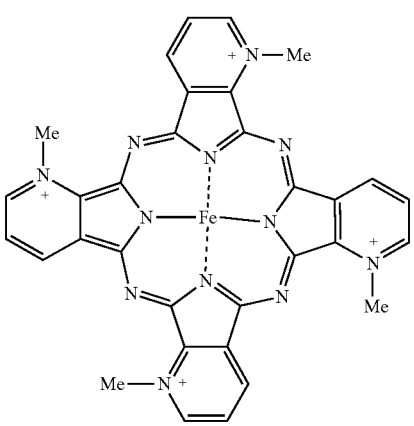
Compound (20)
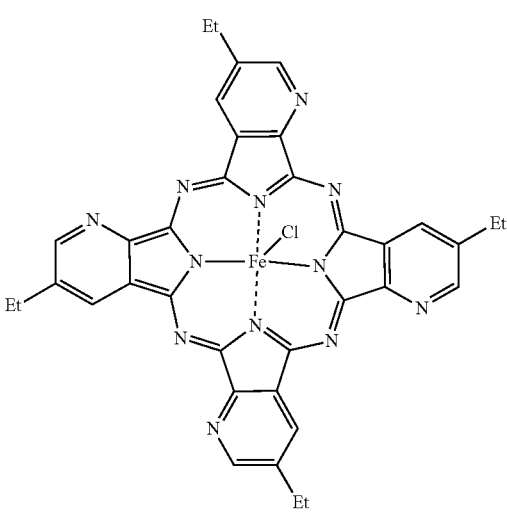

Compound (21)
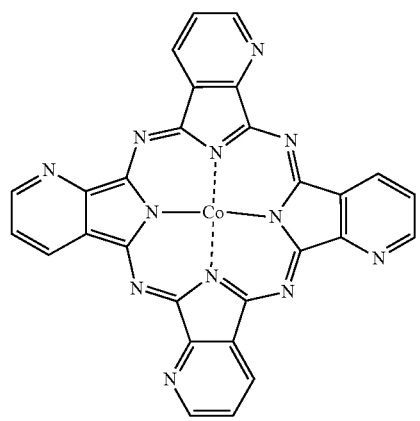
Compound (22)
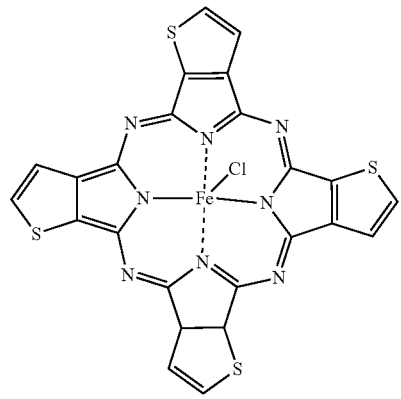
Compound (23)
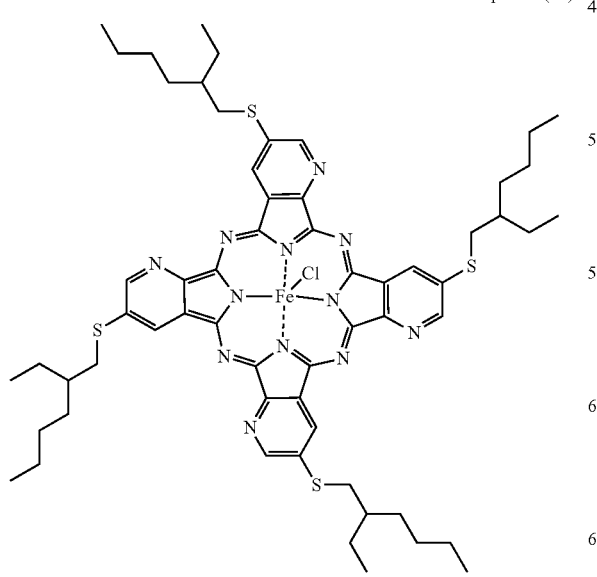
Compound (24)
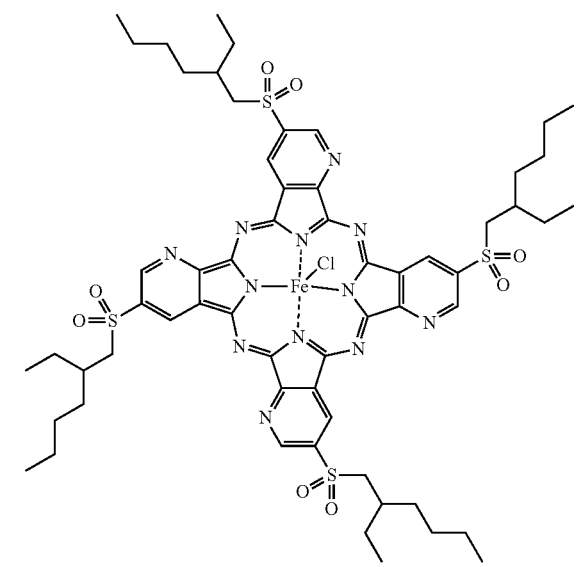
[Chem. 6]
Compound (25)
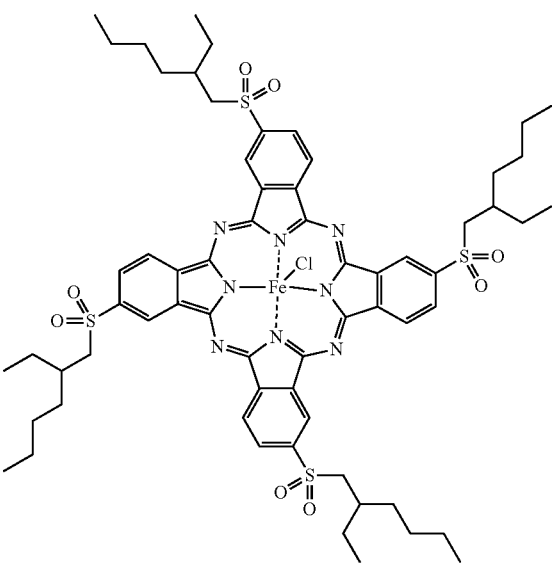

-continued

Compound (26)

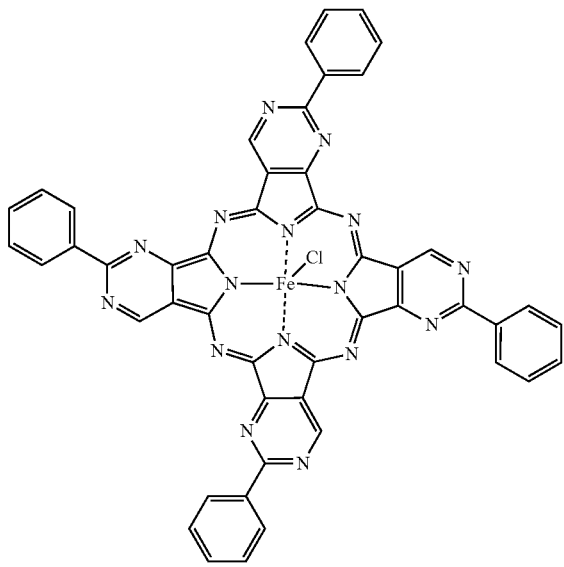

Compound (27)

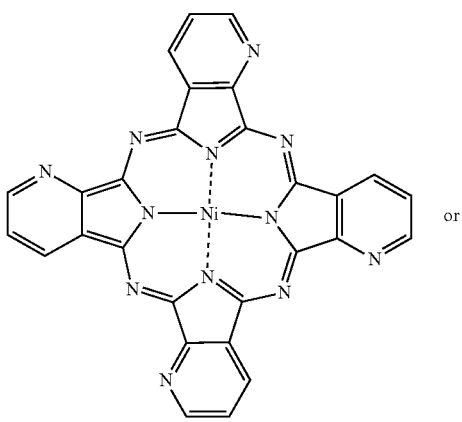

or

Compound (28)

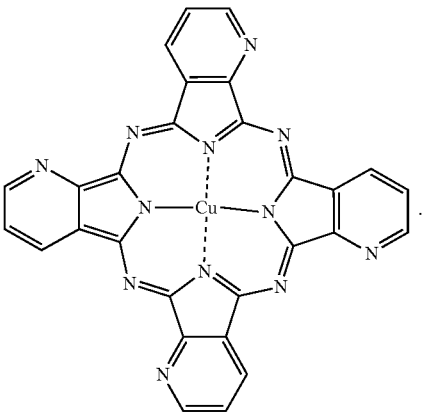

6. The capacitor according to claim 1, wherein the metal complex or an adduct thereof is contained in an amount of 0.1 to 50% by mass with respect to 100% by mass of a total amount of the metal complex or an adduct thereof and the carbon material.

7. The capacitor according to claim 1, wherein the carbon material is selected from activated carbon, Ketjen black, graphite, an amorphous carbon, graphene, carbon black, carbon fibers, mesocarbon microbeads, microcapsule carbon, fullerene, carbon nanoforms, carbon nanotubes, and carbon nanohorns.

8. The capacitor according to claim 1, wherein the electrode includes a composite material for a capacitor containing the metal complex or an adduct thereof and the carbon material which are represented by the above-described expressions (1) or (2).

9. A composite material for a capacitor as defined in claim 8, having a capacity density of 20 F/cm$^3$ or more.

10. A manufacturing method of a composite material for a capacitor according to claim 9, comprising:

(a) a step of preparing a solution by dissolving the metal complex or an adduct thereof in a solvent;

(b) a step of preparing a dispersion liquid by dispersing the carbon material in the solution; and (c) a step of removing the solvent from the dispersion liquid.

11. The manufacturing method according to claim 10, wherein the above-described steps (a) and (b) are performed at a temperature below a boiling point of the solvent.

12. The manufacturing method according to claim 10, wherein a solubility of the metal complex or an adduct thereof with respect to the solvent is 0.1 g/L or more.

* * * * *